(12) United States Patent
Gzara

(10) Patent No.: US 8,005,618 B2
(45) Date of Patent: Aug. 23, 2011

(54) LOGGING WHILE DRILLING SYSTEM

(75) Inventor: Kaïs Gzara, El-Menzah (TN)

(73) Assignee: Schlumberger Technology Corporation, Sugar Land, TX (US)

( * ) Notice: Subject to any disclaimer, the term of this patent is extended or adjusted under 35 U.S.C. 154(b) by 388 days.

(21) Appl. No.: 11/971,276

(22) Filed: Jan. 9, 2008

(65) Prior Publication Data

US 2009/0177403 A1    Jul. 9, 2009

(51) Int. Cl.
*G06F 19/00* (2006.01)
*G01V 1/40* (2006.01)
*G01V 3/18* (2006.01)

(52) U.S. Cl. .......... 702/7; 702/6; 702/9; 702/11; 702/12

(58) Field of Classification Search .................. 702/6, 7, 702/9, 11, 12
See application file for complete search history.

(56) References Cited

U.S. PATENT DOCUMENTS

| | | | |
|---|---|---|---|
| 4,281,712 A | 8/1981 | Murphy et al. | |
| 4,349,737 A | 9/1982 | Smith et al. | |
| 4,353,248 A | 10/1982 | Caldwell | |
| 4,420,975 A | 12/1983 | Nagel et al. | |
| 4,429,221 A | 1/1984 | Allen | |
| 4,529,878 A | 7/1985 | Haley | |
| 4,716,973 A | 1/1988 | Cobern | |
| 4,810,459 A | 3/1989 | Fontenot | |
| 4,894,534 A * | 1/1990 | Paske et al. | 250/254 |
| 5,358,059 A * | 10/1994 | Ho | 175/45 |
| 5,379,216 A | 1/1995 | Head et al. | |
| 5,663,499 A | 9/1997 | Semmelbeck et al. | |
| 5,675,147 A | 10/1997 | Ekstrom et al. | |
| 5,867,806 A | 2/1999 | Strickland et al. | |
| 5,869,755 A | 2/1999 | Ramamoorthy et al. | |
| 5,878,372 A | 3/1999 | Tabarovsky et al. | |
| 6,088,656 A | 7/2000 | Ramakrishnan et al. | |

(Continued)

OTHER PUBLICATIONS

Well logging, Wikipedia website available at http://en.wikipedia.org/wiki/Well_logging>.

*Primary Examiner* — Mohamed Charioui
*Assistant Examiner* — Janet L Suglo
(74) *Attorney, Agent, or Firm* — Darla Fonseca; Brigitte Echols

(57) ABSTRACT

A logging-while-drilling system for efficiently providing a reliable measurement of various petrophysical properties of subsurface earth formations. The logging-while-drilling system generally includes drilling a wellbore within an earth formation, circulating a fluid within the wellbore and injecting it inside the earth formation under pressure, taking a first measurement of the earth formation as altered by the injected fluid within the earth formation during an initial stage of drilling the wellbore, taking a second measurement of the earth formation as altered by the injected fluid within the earth formation during a later stage after the initial stage of drilling the wellbore and determining a zero-time state measurement of the earth formation from a combination of the first measurement and the second measurement, wherein the zero-time state measurement represents the earth formation prior to drilling the wellbore, and determining an infinite-time state measurement of the earth formation from another combination of the first measurement and the second measurement, wherein the infinite-time state measurement represents the earth formation as altered by the injected fluid within the earth formation, assuming the injection had continued indefinitely. Different combinations of the zero-time state measurement, the first measurement, the second measurement, and the infinite-time state measurement, are used to determine the petrophysical parameters of the earth formation, such as but not limited to, volumetric composition, permeability, wettability, and reservoir rock-type.

7 Claims, 14 Drawing Sheets

U.S. PATENT DOCUMENTS

| | | |
|---|---|---|
| 6,344,746 B1 | 2/2002 | Chunduru et al. |
| 6,708,781 B2 | 3/2004 | Ireland |
| 6,795,774 B2* | 9/2004 | Xiao ................................ 702/7 |
| 6,816,787 B2 | 11/2004 | Ramamoorthy et al. |
| 7,062,072 B2 | 6/2006 | Anvionnaz et al. |
| 7,148,471 B2* | 12/2006 | Roscoe et al. ............. 250/269.2 |
| 7,272,504 B2* | 9/2007 | Akimov et al. .................... 702/9 |
| 2005/0028586 A1* | 2/2005 | Smits et al. ................ 73/152.14 |
| 2005/0165553 A1 | 7/2005 | Jammes et al. |
| 2005/0256644 A1* | 11/2005 | Xiao ................................ 702/7 |
| 2006/0116823 A1 | 6/2006 | Griffiths |
| 2006/0192096 A1* | 8/2006 | Radtke et al. ............. 250/269.2 |
| 2006/0226351 A1* | 10/2006 | Stoller et al. ............... 250/269.1 |
| 2007/0143021 A1 | 6/2007 | Griffiths et al. |
| 2007/0143022 A1 | 6/2007 | Chang et al. |
| 2008/0319675 A1* | 12/2008 | Sayers ........................... 702/11 |

* cited by examiner

LOGGING WHILE DRILLING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to well logging and more specifically it relates to a logging while drilling system for efficiently providing a reliable measurement of various petrophysical properties of subsurface earth formations.

2. Description of the Related Art

Any discussion of the related art throughout the specification should in no way be considered as an admission that such related art is widely known or forms part of common general knowledge in the field.

Well logging has been in use for years. Well logging is commonly utilized by the oil and gas industry to evaluate the subsurface formations (i.e. reservoir) of the earth in order to determine various characteristics (e.g. permeability, composition, porosity, etc.) of the subsurface formations and fluids within the subsurface formations. The reservoir rock (i.e. matrix) usually includes a mixture of quartz, clay, limestone, dolomite, anhydrite and various other minerals. The fluids filling-up the voids or cracks (i.e. porosity) in the reservoir generally include a mixture of water, hydrocarbons such as oil and gas, and various others.

The primary objective of well logging by the oil and gas industry is to identify how much hydrocarbons are in place (i.e. reserves in place) by including a breakdown of how much hydrocarbons can be produced (i.e. recoverable reserves), how much hydrocarbons will be left behind, and how fast the reservoir can be drained and the hydrocarbons produced. For this purpose, wells are drilled and the subsurface formations are penetrated are evaluated.

Engineered 'mud' is generally circulated within the wellbore while drilling the well. The mud is injected at the surface inside the drill-pipe and subsequently flows inside the drill-pipe all the way to the drill-bit attached at the bottom of the drill-pipe and wherein the mud then exits the drill-bit from various nozzles and comes back up to the surface through the annular space in-between the outside of the drill-pipe and the wall of the wellbore being drilled (i.e. borehole).

This mud serves many purposes, such as to carry the drilled formations cuttings back to surface, to lubricate and cool the drill-bit and to prevent any formations fluids inflow into the wellbore, by ensuring the hydrostatic pressure of the mud downhole exceeds the pressure of the fluids filling the pore-space of the drilled formations at all times. Because the pressure of the mud inside the wellbore is higher than the pressure of the fluids inside the formations, it is the mud that is forced inside the formations, displacing and flushing away the formations fluids (i.e. a process called invasion).

Whole mud invasion sometimes occurs; however most of the time the pore and pore-throats that make up the voids of the formation are so tiny that the matrix acts like a filter and only a "mud filtrate" (i.e. liquid portion of the mud) invades the subsurface formation. The residual solid contents of the mud (i.e. mud cake) deposit at the interface with the wellbore and build-up over time as invasion progresses thus getting thicker and behaving like a seal to slow-down the invasion process itself. As invasion progresses deeper into the formation, the zone that the mud filtrate reaches into is called "the invaded zone" or also "the flushed zone", and the zone that has not been contaminated by the invasion process yet is called "the virgin zone".

Various methods have been utilized to evaluate the subsurface formations penetrated. Two commonly utilized options are either to "core" the wellbore or "log" the wellbore. Coring the wellbore generally includes cutting a cylindrical core within the subsurface formation and recovering the core to the surface to analyze and evaluate the core in dedicated labs. However coring techniques are time-consuming and prohibitive, and cutting a core and bringing it to the surface might modify its characteristics due to different temperature, pressure, confinement configuration at the surface versus downhole and not being able to preserve the original fluid information. In addition, the turn-around-time required to complete a core study, is on the order of months if not years which is inconvenient for quick decision-making purposes.

Logging the wellbore generally includes acquiring various petrophysical measurements over the formations penetrated by the wellbore by way of sondes fitted with various sensors. The sondes are conveyed down the drilled well to collect various types of information and data (i.e. logs). Logging is generally the time efficient way to have information readily available about the well (i.e. the information is generally in electronic format); however it can require advanced interpretation techniques in order to transform various measurements into the desired rock and fluid composition data needed to properly evaluate the subsurface formation.

Various ways in which to log data have been performed in the past. One such way is by utilizing "wireline" logs, wherein the wireline logs were acquired days after drilling a wellbore and they were so called, because the sondes loaded with sensors were lowered deep beneath the surface of the earth and inside the wellbore, using an armored electric wire attached to the surface. The electric wire was used to lower the sensors in the well, transmit power to the sensors, send commands to the tools downhole, retrieve data to the surface and recover the sondes to the surface.

Generally the sensors utilized to generate log data and measurements (e.g. measurements using neutron sources or gamma-ray sources, and neutron or gamma-ray detectors, and nuclear-magnetic-resonance NMR measurements, etc.) only reach a few inches deep (i.e. radially away from the wellbore wall) within the subsurface formation being investigated, wherein the volume being investigated by wireline logs acquired at "wireline time" (i.e. wireline logs acquired days after drilling a wellbore) is generally within the invaded-zone, with the exception of deep-reading electromagnetic resistivity measurements, and with the exception of a few situations encountered sometimes in practice, where the invasion itself does not reach any deeper than a few inches at wireline time.

The invaded-zone and the virgin-zone only share the formation rock (i.e. matrix) and voids (i.e. porosity) in common, but the fluid composition is different in-between both, and there are even situations where the invaded-zone and the virgin-zone do not even share the matrix and the porosity in common, such as in case of chemical interaction in-between the mud-filtrate and one or more of the matrix minerals. Evaluating the invaded zone on its own is therefore generally insufficient, when it is not flawed such as in the situations discussed above, wherein the virgin-zone is the volume of the subsurface formation that is of most interest to the oil and gas industry from a hydrocarbons reserves perspective, and wherein understanding differences and similarities in-between both the invaded-zone and the virgin-zone fluid contents, is necessary for a better understanding of how efficiently mud-filtrate displaced and flushed the original formation fluids, and hence permeability and recoverable reserves estimates.

The deep-reading electromagnetic resistivity measurements reaching beyond the invaded-zone and into the virgin-zone, traditionally provided a useful means to estimate water content in the virgin-zone, and hence the hydrocarbons content in the virgin-zone was worked-out by subtracting the estimated water content in the virgin-zone, from the total porosity computed from logs reading in the invaded zone (and bearing in mind the underlying assumption that the invaded-zone and the virgin-zone shared the porosity in common). However resistivity logs introduced another level of complication of their own, due to the resistivity equations used to convert resistivity into water content, wherein the equations can be very challenging to design, thus making it difficult to extract reliable saturation and connected-porosity information using resistivity data. This is for example the case for carbonate formations and low-resistivity-pay intervals, whereby empirical techniques are extensively used (and these empirical techniques usually involve neural-network and reservoir rock-typing techniques).

Other times, variable formation water salinity, such as but not limited to, water injection situations to maintain reservoir pressure, fresh formation water scenarios, or chemical interaction in-between the mud-filtrate and the formation matrix minerals, can make it virtually impossible to extract reliable water content information from either resistivity or thermal neutron capture cross-section logs (i.e. SIGMA logs) individually, or together simultaneously.

Another more recent method to log data from the wellbore includes "logging-while-drilling", wherein sensors similar to those used for wireline logging were actually integrated in the drill-pipe close to the drill-bit, wherein the sensors readings had the added benefit of being available almost real-time as the subsurface formations are drilled. Although, invasion is generally shallower while the log data is acquired utilizing logging-while-drilling techniques (rather than while utilizing wireline logging techniques) because the sensors are an integral part of the drill-string and the measurements are made just hours after the earth formation is freshly drilled, invasion still cannot be dismissed, and invasion effects cannot be disregarded, as invasion is still not technically zero.

Thus, logging-while-drilling measurements generally include at least a portion of the invaded zone, and assuming otherwise that logging-while-drilling measurements can be considered representative of the virgin zone only, can naturally lead to erroneous information relating to the subsurface formation. Because of the inherent problems with the related art, there is a need for a new and improved logging-while-drilling system, to remedy the situation thru a new and efficient log data acquisition and interpretation methodology, that fully accounts for the invasion process, by manufacturing two separate log datasets totally immune to invasion, and that respectively embody the invaded zone only and the virgin zone only, thereby enabling a new suite of formation evaluation applications that could not be considered in the past.

BRIEF SUMMARY OF THE INVENTION

The general purpose of the present invention is to provide a logging-while-drilling system that has many of the advantages of the well logging techniques mentioned heretofore. The invention generally relates to a well logging system, which includes drilling a wellbore within an earth formation, while circulating a fluid within the wellbore and injecting it inside the formation under pressure, taking a first measurement of the earth formation during an initial stage of drilling the wellbore, taking a second measurement of the earth formation during a later stage after the initial stage of drilling the wellbore, and determining a zero time state measurement of the earth formation (i.e. measurement of the earth formation as if prior to drilling) from a combination of the first measurement and the second measurement, and determining an infinite time state measurement of the earth formation (i.e. measurement of the earth formation as if the injection were allowed to continue unimpeded forever, until such measurement of the earth formation would reach a stable final value) from another combination of the first measurement and the second measurement. Different combinations of the zero-time state measurement, the first measurement, the second measurement, and the infinite-time state measurement, are used to determine the petrophysical parameters of the subsurface earth formation, such as but not limited to, volumetric composition, permeability, wettability, and reservoir rock-type.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a logging-while-drilling system for efficiently providing and tracking a reliable measurement of depth-of-invasion at different times during the process of drilling a wellbore and evaluating a subsurface earth formation, in the general case where a controlled fluid is circulated within the wellbore and injected inside the formation under pressure, whereby the invasion-front progresses radially deeper into the formation in a time-dependent fashion.

An object is to provide a logging-while-drilling system for efficiently providing a reliable measurement of various petrophysical properties of subsurface earth formations, in the general case where a controlled fluid is circulated within the wellbore and injected inside the formations under pressure, thereby altering the subsurface earth formations composition or characteristics, in a time-dependent fashion.

Another object is to provide a logging-while-drilling system that provides reliable and quantitative resistivity-independent formations fluid saturations, and connected-porosity computation techniques.

An additional object is to provide a logging-while-drilling system that provides reliable and quantitative water-salinity-independent formations fluid saturations and connected-porosity computation techniques.

A further object is to provide a logging-while-drilling system that provides reliable and quantitative porosity and fluid saturations in gas-bearing formations.

Another object is to provide a logging-while-drilling system that provides reliable and quantitative porosity in situations of chemical interaction between mud-filtrate and the subsurface formation Another object is to provide a logging-while-drilling system that provides a direct computation of any preferred resistivity equation parameters (e.g. Archie's resistivity equation parameters cementation factor "m" and saturation exponent "n") to be used as proxy for porosity-typing and wettability.

Another object is to provide a logging-while-drilling system that provides improved formations static-permeability transforms from reliable and quantitative connected-porosity multiple computation techniques, in addition to a new dynamic-permeability estimate.

Another object is to provide a logging-while-drilling system that provides improved formations reservoir rock-typing techniques, utilizing the wealth of new petrophysical measurements determined above (e.g. new zero-time state measurements and infinite-time state measurements) and characteristics (e.g. new volumetric composition, and Archie's resistivity equation cementation factor "m" and saturation exponent "n", and permeability).

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
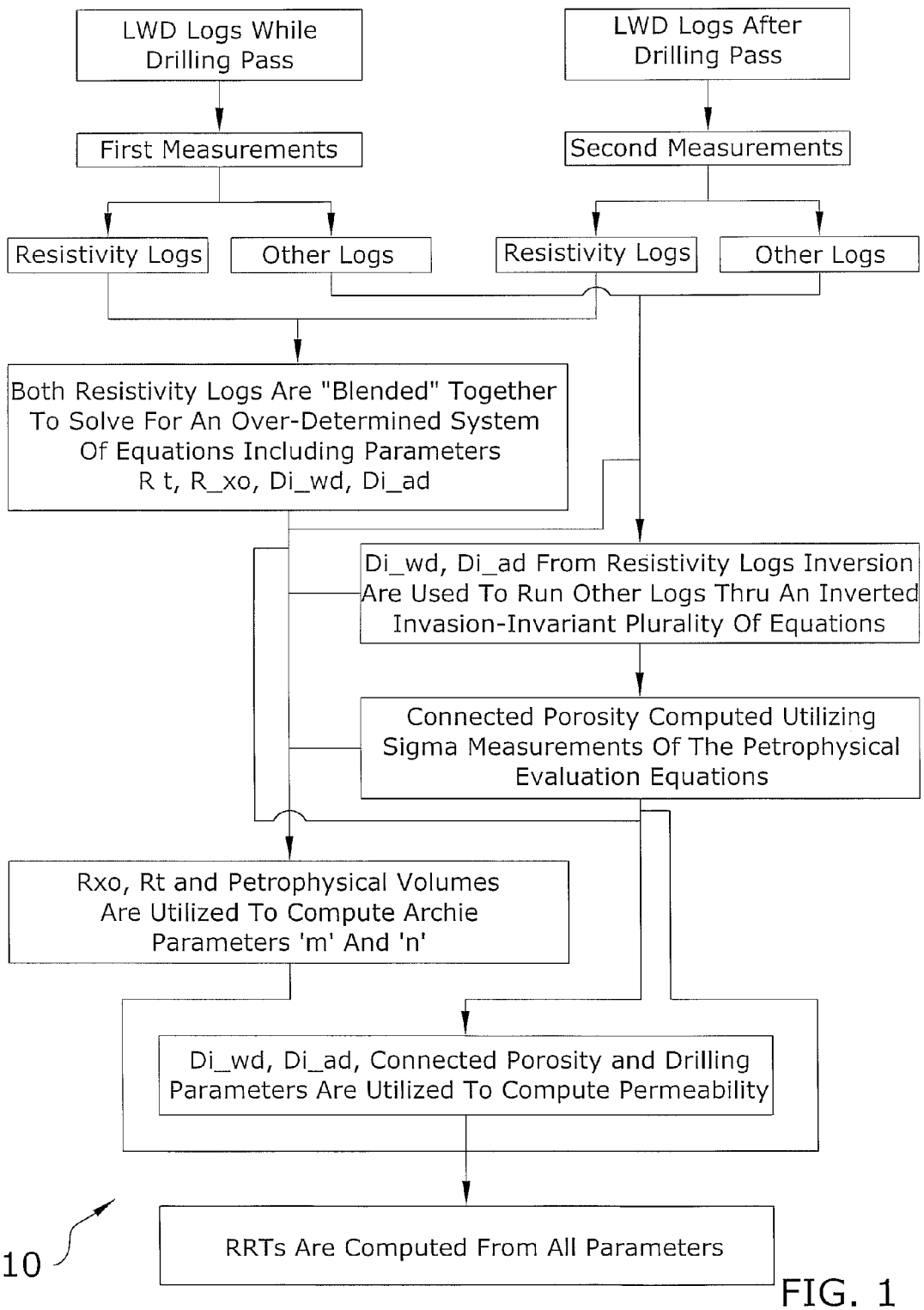
FIG. 1 is a flowchart illustrating the process of the present invention.
Figure 2:
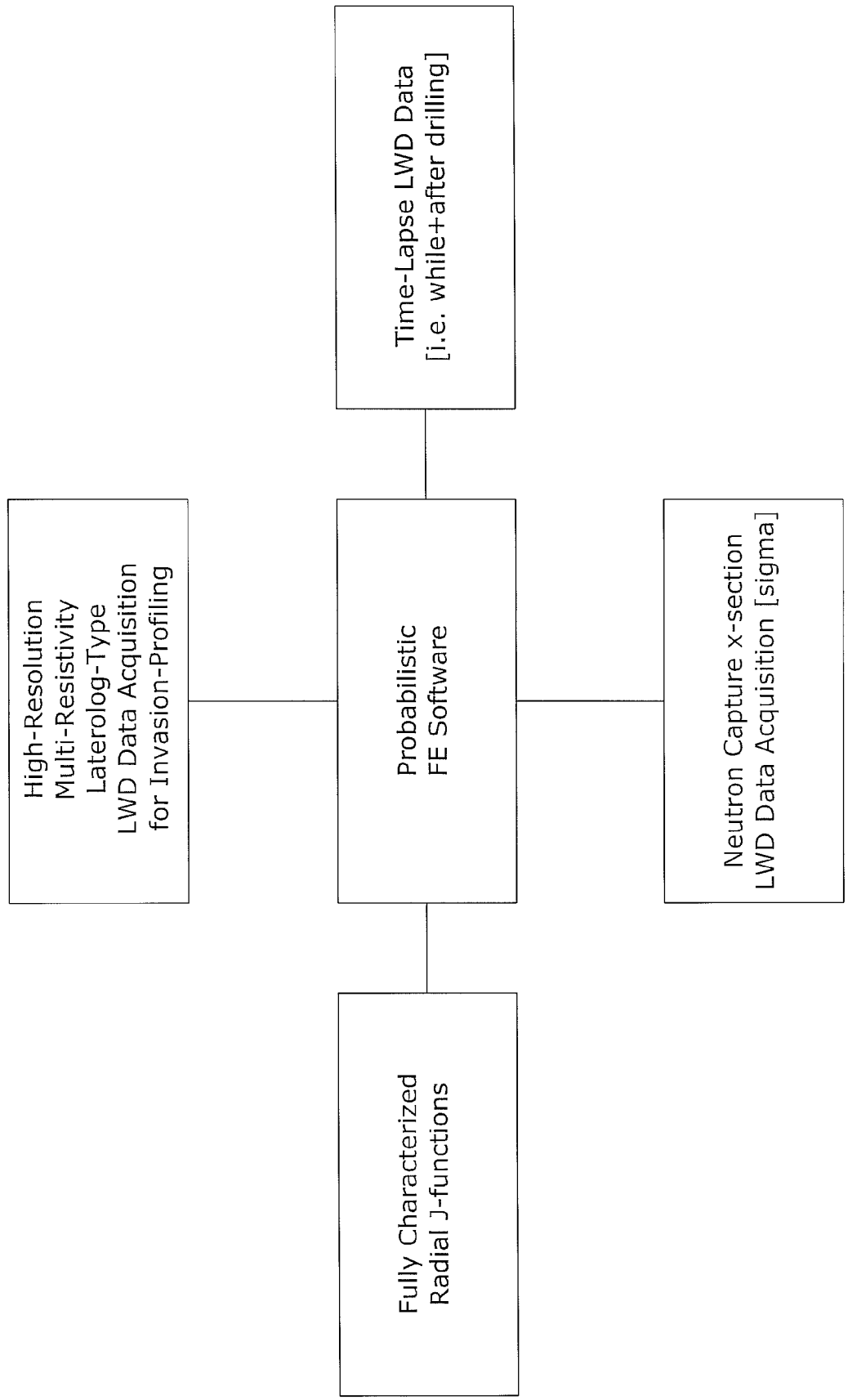
FIG. 2 is a block diagram illustrating the key computational components of the present invention.

Turning now descriptively to the drawings, in which similar reference characters denote similar elements throughout the several views, FIGS. 1 through 12 illustrate a logging-while-drilling system 10, which comprises drilling a wellbore 22 within an earth formation 20, while circulating a fluid within the wellbore 22 and injecting it inside the formation 20 under pressure, taking a first measurement of the earth formation 20 during an initial stage of drilling the wellbore 22, taking a second measurement of the earth formation 20 during a later stage after the initial stage of drilling the wellbore 22, and determining a zero-time state measurement of the earth formation 20 (i.e. measurement of the earth formation as if prior to drilling) from a combination of the first measurement and the second measurement, and determining an infinite-time state measurement of the earth formation 20 (i.e. measurement of the earth formation 20 as if the injection were allowed to continue unimpeded forever, until such measurement of the earth formation 20 would reach a stable final value) from another combination of the first measurement and the second measurement. Different combinations of the zero-time state measurement, the first measurement, the second measurement, and the infinite-time state measurement, are used to determine the petrophysical parameters of the subsurface earth formation, such as but not limited to, volumetric composition, permeability, wettability, and reservoir rock-type (RRT).

The present invention utilizes a logging-while-drilling (LWD) approach to taking various measurements of subsurface formations 20, relating to the composition of the subsurface formation 20 in terms of the minerals that constitute the rock (i.e. matrix) and the fluids that fill-up the porosity, and the permeability, pore-network type, and wettability of the subsurface formation 20. The first set of measurements (i.e. while-drilling pass) is typically acquired hours after the subsurface formations 20 have been freshly drilled (i.e. while mud filtrate invasion is rather shallow); whereas the second set of measurements (i.e. after-drilling pass) is typically acquired a day or two at least after the subsurface formations 20 have been drilled (i.e. after mud filtrate invasion has progressed significantly).

Figure 12:
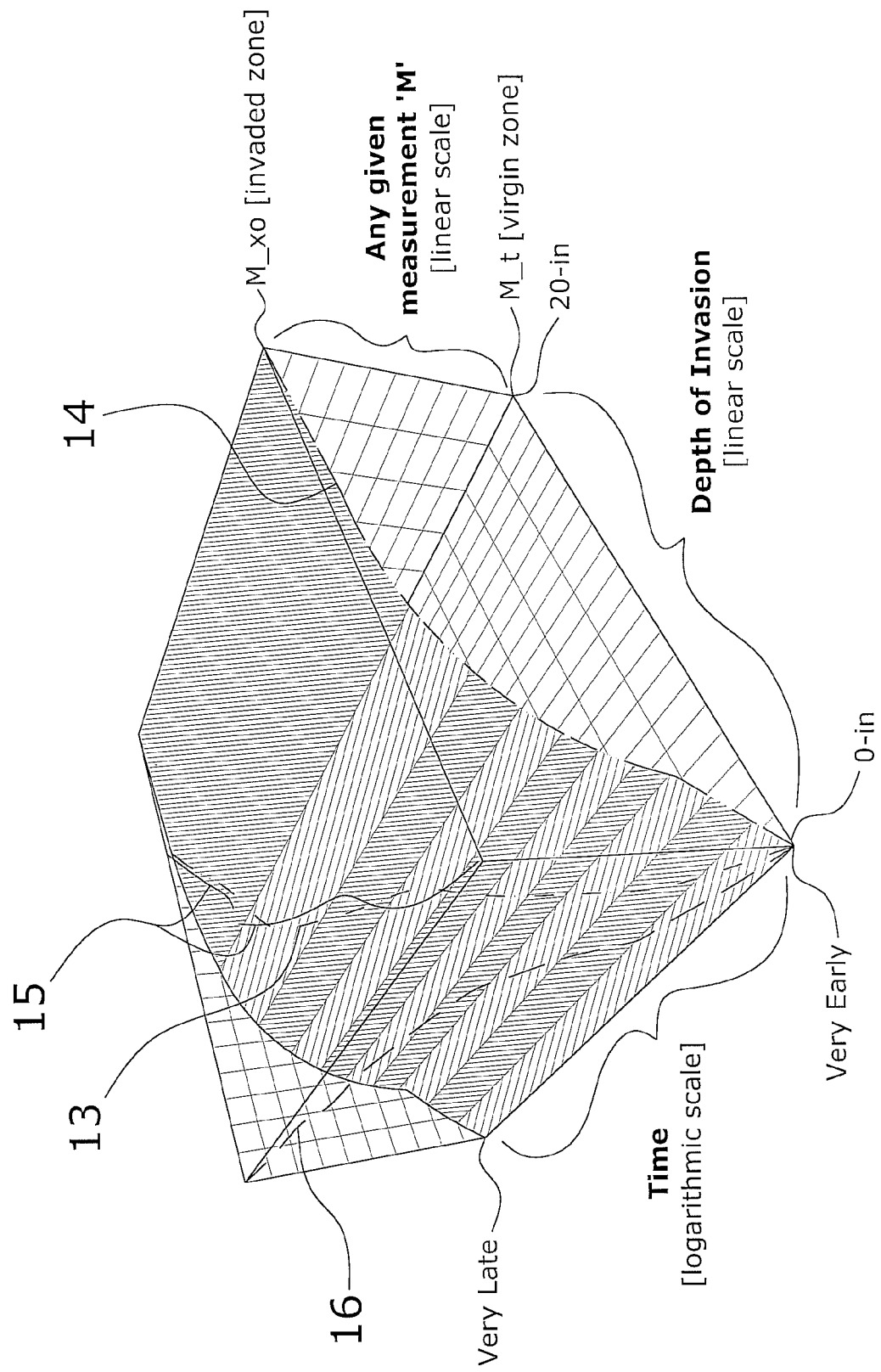
FIG. 12 illustrates how any given individual measurement "M" changes with depth of invasion, and how depth-of-invasion itself changes with times, wherein the changes of "M" with depth-of-invasion is what allows us (among other things) to invert zero-time state measurements, and infinite-time state measurements and the changes of depth-of-invasion with time is what allows us (among other things) to extract a dynamic permeability estimate.

FIG. 12 shows how any given individual measurement "M" changes with depth of invasion, and how depth-of-invasion itself changes with time. The changes of "M" with depth-of-invasion, bears information in relation to zero-time state measurements and infinite-time state measurements. The changes of depth-of-invasion with time, bears information in relation to permeability. A first curve 13 in FIG. 12 illustrates a curve in 3D space, representing how the measurement "M" changes with time and depth of invasion. A second curve 14 in FIG. 12 illustrates a curve in the projection of the first curve 13 on this plane, showing how the measurement "M" changes with depth of invasion [also called the J-function]. A third curve 15 in FIG. 12 illustrates a curve in the projection of the first curve 13 on this plane, showing how depth of invasion changes with time. A fourth curve 16 in FIG. 12 illustrates a curve in the projection of the first curve 13 on this plane, showing how the measurement "M" changes with time.

Because the first set of measurements (i.e. while-drilling pass) and the second set of measurements (after-drilling pass) sample the same physical volume of the subsurface formation 20, but at different points in time corresponding to two different mud filtrate invasion configurations (i.e. with a different weighing of the invaded zone 24 and virgin zone 26 contributions in-between the two sets of measurements), various combinations of the first set of measurements (i.e. while-drilling pass) and the second set of measurements (i.e. after-drilling pass) can be used to manufacture two separate measurement datasets, that respectively embody the invaded zone 24 only and the virgin zone 26 alone, thereby enabling a new suite of formation evaluation applications that could not be considered in the past.

For example, we can derive $\Sigma_{xo}$ [invaded-zone 24 thermal neutron capture cross-section] and $\Sigma_t$ [virgin-zone 26 thermal neutron capture cross-section], computed from LWD $\Sigma$ measurements while-drilling and after-drilling, we can derive $Rhob_{xo}$ [invaded-zone 24 bulk-density] and $Rhob_t$ [virgin-zone 26 bulk-density], computed from LWD Rhob measurements while-drilling and after-drilling, we can derive $Tnph_{xo}$ [invaded-zone 24 neutron porosity] and $Tnph_t$ [virgin-zone 26 neutron porosity], computed from LWD Tnph measurements while-drilling and after-drilling, and likewise for $Pef_{xo}$ [invaded-zone 24 photoelectric factor] and $Pef_t$ [virgin-zone 26 photoelectric factor], $C/O_{xo}$ [invaded-zone 24 Carbon/Oxygen ratio(s)] and $C/O_t$ [virgin-zone 26 Carbon/Oxygen ratio(s)], nuclear-magnetic-resonance multi-dimensional Distribution(s)$_{xo}$ [invaded-zone 24 Distribution(s)] and Distribution(s)$_t$ [virgin-zone 26 Distribution(s)], which can be computed from LWD Pef, C/O, and nuclear-magnetic-resonance Distributions while-drilling and after-drilling.

The technology of the present invention generally includes the following five components. The first component is a time-lapse data acquisition, wherein the while-drilling pass (i.e. first measurement of the subsurface earth formations) is to be acquired with as fast rate-of-penetration (ROP) as possible, and the after-drilling pass (i.e. second measurement of the subsurface earth formations) is to be acquired as late as possible, including a further log-inject-log (LIL) step in a further refinement of the technique (additional third, fourth, etc. measurement of the subsurface earth formations such as during LIL passes are optional and depend on the particular petrophysical application). The second component is a mud-filtrate invasion profiling, which may be performed utilizing a variety of techniques, such as but not limited to, utilizing high-resolution array-resistivity laterolog-type measurements from the GEOVISION LWD tool sold by SCHLUMBERGER.

The third component is an invasion-dependent but resistivity-independent measurement of the subsurface earth formation as applicable, such as but not limited to thermal neutron porosity (Tnph) or bulk-density (Rhob) log data acquisition in case of gas-bearing subsurface earth formations, or thermal neutron capture cross-section SIGMA ($\Sigma$) log data acquisition in general. This may be performed utilizing a variety of techniques, such as but not limited to, utilizing the ECOSCOPE LWD tool sold by SCHLUMBERGER, including an optional Carbon/Oxygen (C/O) log in a further refinement of the technique (or in general any neutron-type measurement, including but not limited to, thermal neutron porosity or epithermal neutron porosity or any combination thereof, using thermal neutron detectors or gamma-ray detectors or any combination thereof, thermal neutron capture cross-section, using thermal neutron detectors or gamma-ray detectors or any combination thereof, Carbon/Oxygen ratios or any other ratios using any combination of near or far detectors, using capture or inelastic gamma-ray spectra or any combination thereof, all of the above using any combination of neutron sources either chemical that do not allow time-based measurements, or electronic that allow time-based measurements, and using any detector arrangements whether offset from the neutron source or sources in the axial direction along the axis of the tool and the wellbore, or azimuthally offset as well, or any combination thereof).

The fourth component is a fully characterized radial response J-functions for the various LWD measurements considered. The fifth component is a probabilistic formation evaluation software (e.g. ELAN sold by SCHLUMBERGER), tailored to receive as input the entire suite of newly manufactured invasion-invariant log datasets, and the corresponding computed uncertainty errors (i.e. covariance matrix), and tailored to produce petrophysical characteristics of the subsurface earth formations, and the corresponding propagated uncertainty errors (i.e. covariance matrix).

B. Maximum-Entropy Constrained Dual-Pass Data Inversion

Figure 3:
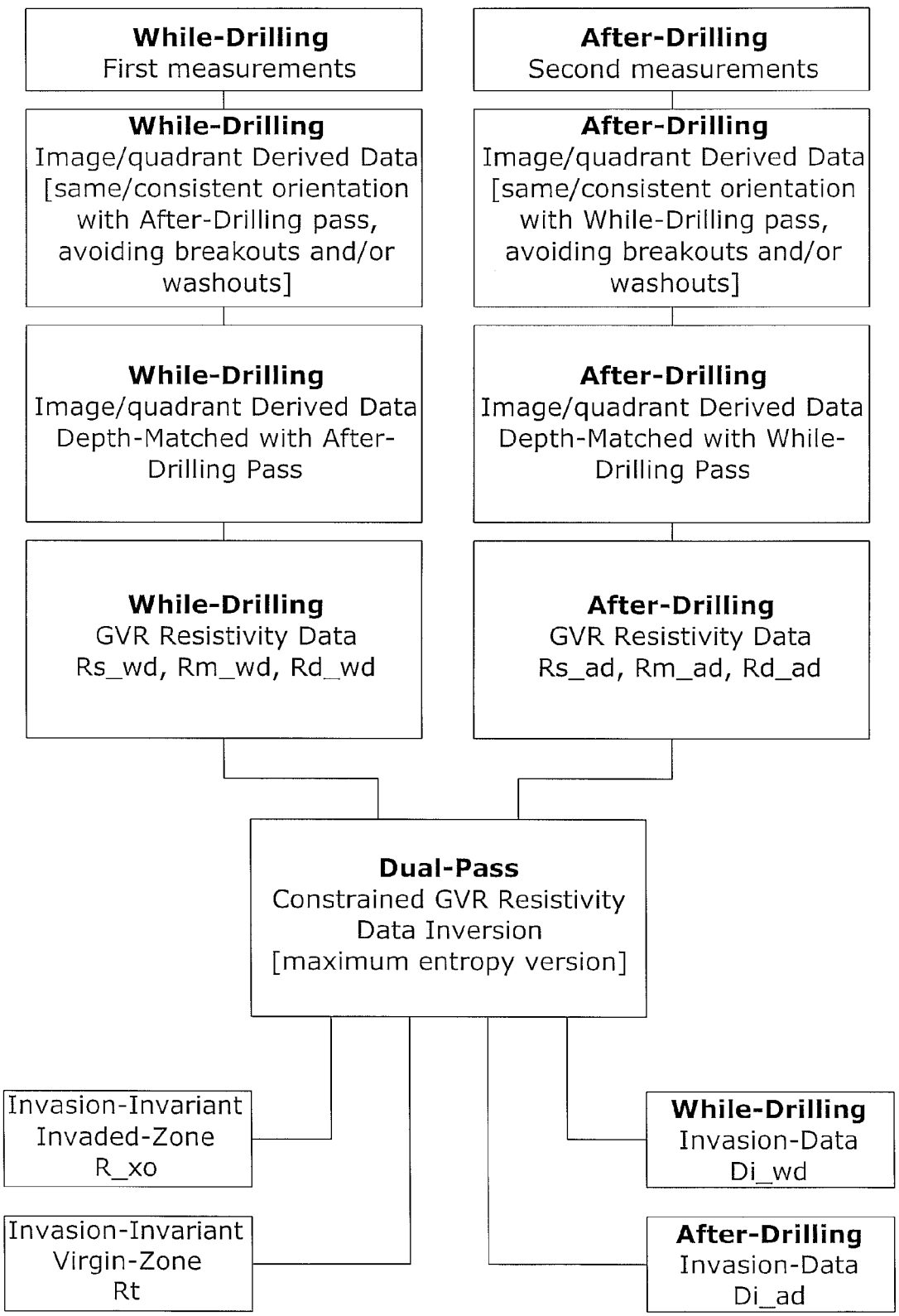
FIG. 3 is a diagram illustrating the maximum-entropy constrained dual-pass array-resistivity data inversion of the present invention.

FIG. 3 illustrates a method of array-resistivity laterolog-type data inversion utilized by the present invention (the "array" terminology refers to multiple similar measurements, in this case resistivity measurements, with differing depth-of-investigation DOI into the subsurface earth formation, and varying from very-shallow to very-deep, depending on the specific design of the tool and multiple electro-magnetic source and sensor arrangements).

The present invention accurately depth matches the while-drilling pass and the after-drilling pass and inverts simultaneously all of the array-resistivity data from both the while-drilling (AR1_wd, AR2_wd, . . . ARi_wd) and after-drilling (AR1_ad, AR2_ad, . . . ARi_ad) passes in an over-determined fashion, allowing only the depth-of-invasion ($D_i$) to vary in-between the two passes, constraining the depth-of-invasion from the after-drilling pass ($D_i\_ad$) to be larger than the depth-of-invasion from the while-drilling pass ($D_i\_wd$). The inversion solves for a unique reliable invaded-zone resistivity ($R_{xo}$), a unique reliable virgin-zone resistivity ($R_t$), and two reliable invasion profiles (i.e. depth-of-invasion while-drilling $D_i\_wd$ and depth-of-invasion after-drilling $D_i\_ad$). Moreover, it is proposed in the present invention to use a "maximum entropy" and probabilistic type of inversion to fully document the quality and reliability of the inverted resistivities $R_{xo}$ and $R_t$, and invasion profiles (i.e. depth-of-invasion while-drilling $D_i\_wd$ and depth-of-invasion after-drilling $D_i\_ad$).

The over-determined system of equations can be represented as follows (assuming array-resistivity log data depends on depth-of-invasion alone, and discarding borehole effects and other geometrical effects on array-resistivity log data, which we assume have already been accounted for):

$$AR1\_wd[\text{theoretical}] = R_{xo} \times J_{AR1}(D_i\_wd) + R_t \times (1 - J_{AR1}(D_i\_wd))$$
$$AR2\_wd[\text{theoretical}] = R_{xo} \times J_{AR2}(D_i\_wd) + R_t \times (1 - J_{AR2}(D_i\_wd))$$
$$AR3\_wd[\text{theoretical}] = R_{xo} \times J_{AR3}(D_i\_wd) + R_t \times (1 - J_{AR3}(D_i\_wd))$$
$$ARi\_wd[\text{theoretical}] = R_{xo} \times J_{ARi}(D_i\_wd) + R_t \times (1 - J_{ARi}(D_i\_wd))$$
$$AR1\_ad[\text{theoretical}] = R_{xo} \times J_{AR1}(D_i\_ad) + R_t \times (1 - J_{AR1}(D_i\_ad))$$
$$AR2\_ad[\text{theoretical}] = R_{xo} \times J_{AR2}(D_i\_ad) + R_t \times (1 - J_{AR2}(D_i\_ad))$$
$$AR3\_ad[\text{theoretical}] = R_{xo} \times J_{AR3}(D_i\_ad) + R_t \times (1 - J_{AR3}(D_i\_ad))$$
$$ARi\_ad[\text{theoretical}] = R_{xo} \times J_{ARi}(D_i\_ad) + R_t \times (1 - J_{ARi}(D_i\_ad))$$

Cost Function($R_{xo}$, $R_t$, $D_i\_wd$, $D_i\_ad$) =

$$\sum_{\text{All Array Resistivities 'i'}} \frac{(ARi\_wd - ARi\_wd[\text{theoretical}])^2}{\text{Error}_{ARi}^2} +$$

$$\frac{(ARi\_ad - ARi\_ad[\text{theoretical}])^2}{\text{Error}_{ARi}^2}$$

Probability($R_{xo}$, $R_t$, $D_i\_wd$, $D_i\_ad$)$\alpha$ $$\text{Exp}(-\text{Cost Function}(R_{xo}, R_t, D_i\_wd, D_i\_ad))$$

The different ARi corresponds to the different array-resistivity measurements available (and the mnemonics "wd" and "ad" represent respectively the while-drilling pass and the after-drilling pass) with deeper-and-deeper depth-of-investigation (DOI). The different $J_{ARi}$ corresponds to the different radial response J-functions of the individual ARi array-resistivity measurements available. The different $\text{Error}_{ARi}$ correspond to the different error-bands around individual ARi array-resistivity measurements available. It should be noted that the inversion of this over-determined system of equations, represents the added benefit of letting us exclude one or more of the array-resistivity measurements (ARi) from the above set of equations (for as long as the system of equations does not become under-determined), should the sensors corresponding to such array-resistivity measurements (ARi) fail during log data acquisition for example.

The use of time-lapse data from the same high-resolution array-resistivity laterolog-type tools ensures that resistivity measurements changes can primarily be attributed to invasion only, which further provides for reliable and accurate invasion profiling, and it also allows the derived invaded-zone 24 resistivity ($R_{xo}$) and virgin-zone 26 resistivity ($R_t$) values to be representative of the same or similar formation volume. It is a well-known fact that when the contrast in-between $R_{xo}$ and $R_t$ is low, the inverted invasion profiles (i.e. depth-of-invasion while-drilling $D_i\_wd$ and depth-of-invasion after-drilling $D_i\_ad$) become inaccurate. It should however be noted, that the key physical quantity that enters in the derivation of various petrophysical parameters, such as permeability, is the actual volume of mud-filtrate that has invaded the subsurface formation 20 at the time of interest, and not the depth-of-invasion itself. This volume of mud-filtrate remains accurate even when the contrast in-between $R_{xo}$ and $R_t$ is low, and when the inverted invasion profiles $D_i\_wd$ and $D_i\_ad$ are inaccurate, because it results from the "product" of the invasion profile and the connected-porosity ($\Phi_c$), and this connected-porosity ($\Phi_c$) itself depends on the contrast between $R_{xo}$ and $R_t$, and becomes precisely nil in the case of low contrast in-between $R_{xo}$ and $R_t$. This cancels any undesirable effects from the unreliable inverted invasion profiles $D_i\_wd$ and $D_i\_ad$ in such cases of low contrast in-between $R_{xo}$ and $R_t$.

C. Inverting for Virgin Zone and Invaded Zone Log Equivalents

Figure 4A:
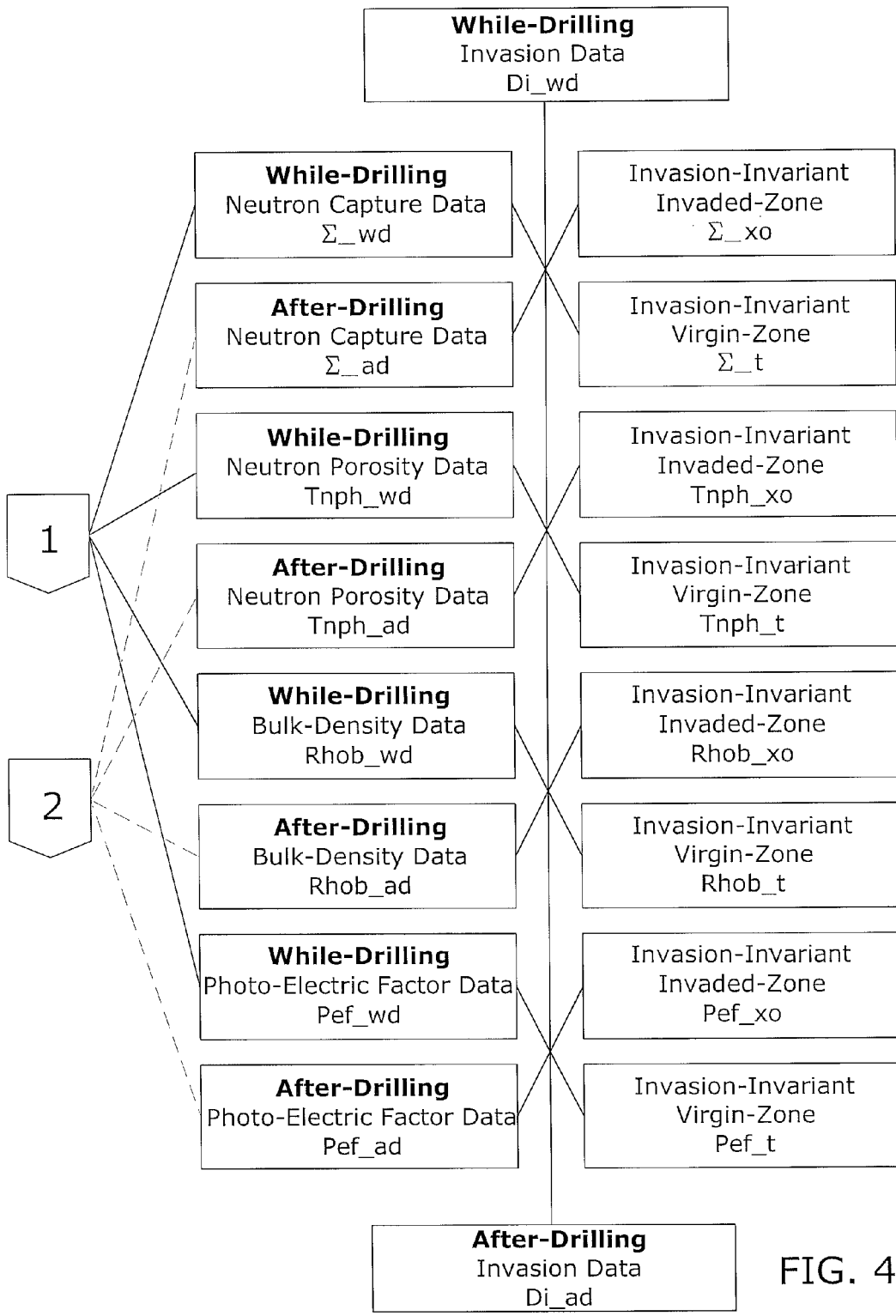
FIGS. 4a and 4b is a diagram illustrating the method of inverting for virgin-zone and invaded-zone log equivalents using "time-lapse" data (i.e. data acquired from multiple or repeat data acquisition passes, and recorded while the invasion-front progressed deeper in the "lapse of time" in-between the different repeat data acquisition passes), and the "known" invasion-profiles.
Figure 4B:
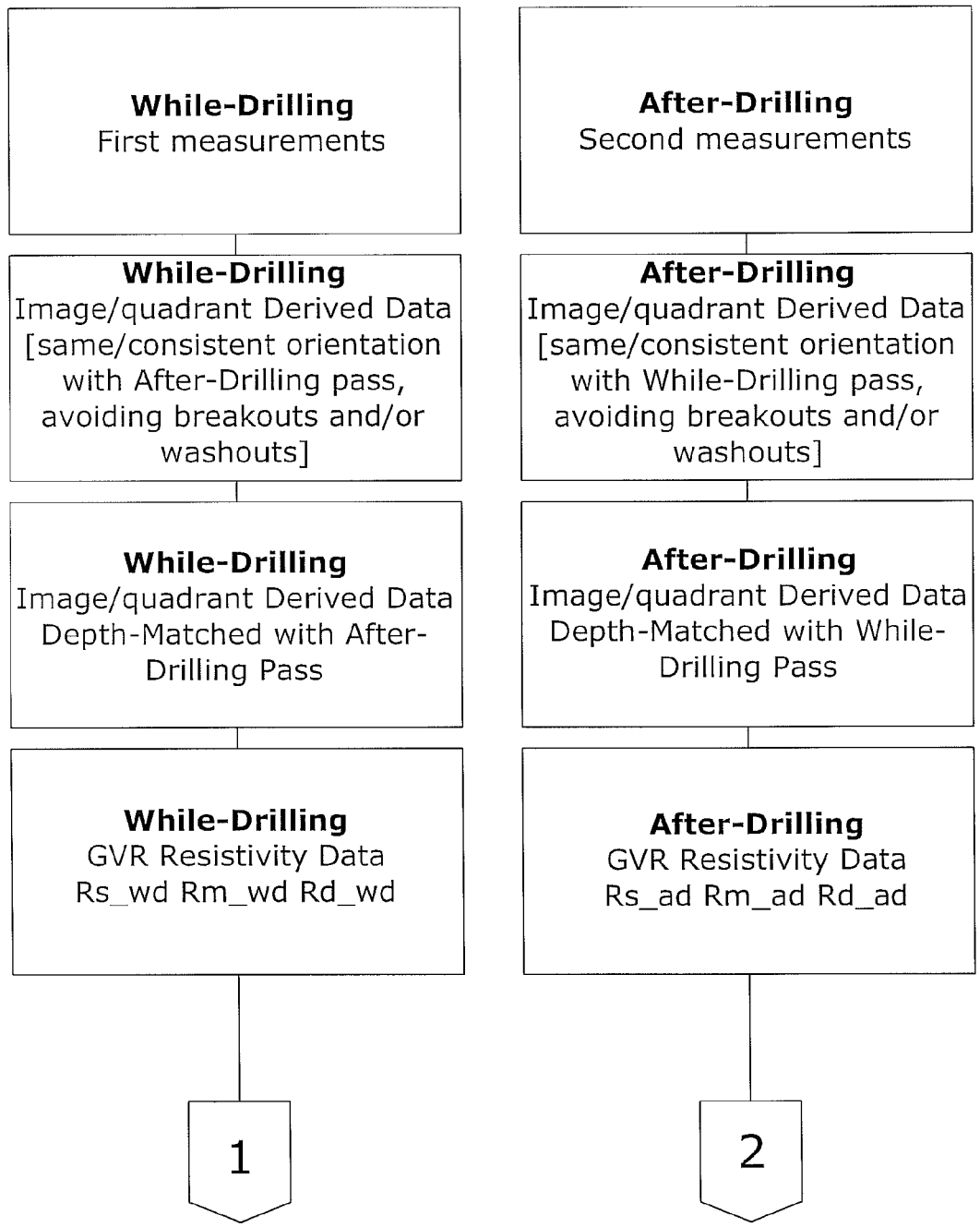

FIG. 4 depicts a method for inverting and manufacturing virgin zone 26 and invaded zone 24 log equivalents, from a combination of time-lapse logging-while-drilling data as input, and utilizing the invasion profiles Di_wd and Di_ad already inverted in FIG. 3. This workflow makes use of the simple concept of radial response J-functions, described next, and assumes they have been fully characterized for individual log measurements. For any individual log measurement "M", which would read "$M_t$" for a purely virgin zone 26, and would read "$M_{xo}$" for an entirely invaded zone 24; the J-function for this measurement, describes how this measurement "M", would change continuously from "$M_t$" to "$M_{xo}$", as the depth of invasion $D_i$ changes and increases slowly from "0" to "infinity" (assuming a step invasion profile), as shown also in FIG. 12.

Therefore, radial J-functions vary from 0-100 percent and the above definition can be mathematically expressed in the following equation:

$$M = M_{xo} \times J_M(D_i) + M_t \times (1 - J_M(D_i))$$

The present invention takes advantage of the previously illustrated equation whenever a particular or given logging-while-drilling measurement, has been acquired twice in a time-lapse fashion, the first measurement or once while-drilling measurement assuming shallow invasion, and the second measurement or once after-drilling measurement assuming deep invasion. In this case, one ends-up with the following two equations:

$$M\_wd = M_{xo} \times J_M(D_i\_wd) + M_t \times (1 - J_M(D_i\_wd))$$

$$M\_ad = M_{xo} \times J_M(D_i\_ad) + M_t \times (1 - J_M(D_i\_ad))$$

We may then readily solve for the invaded zone 24 and virgin zone 26 unknowns as shown in the following equations:

$$M_t = \frac{\begin{vmatrix} J_M(D_i\_wd) & M\_wd \\ J_M(D_i\_ad) & M\_ad \end{vmatrix}}{\begin{vmatrix} J_M(D_i\_wd) & (1 - J_M(D_i\_wd)) \\ J_M(D_i\_ad) & (1 - J_M(D_i\_ad)) \end{vmatrix}}$$

$$= \frac{M\_ad \times J_M(D_i\_wd) - M\_wd \times J_M(D_i\_ad)}{J_M(D_i\_wd) \times (1 - J_M(D_i\_ad)) - J_M(D_i\_ad) \times (1 - J_M(D_i\_wd))}$$

$$M_{xo} = \frac{\begin{vmatrix} M\_wd & (1 - J_M(D_i\_wd)) \\ M\_ad & (1 - J_M(D_i\_ad)) \end{vmatrix}}{\begin{vmatrix} J_M(D_i\_wd) & (1 - J_M(D_i\_wd)) \\ J_M(D_i\_ad) & (1 - J_M(D_i\_ad)) \end{vmatrix}}$$

$$= \frac{M\_wd \times (1 - J_M(D_i\_ad)) - M\_ad \times (1 - J_M(D_i\_wd))}{J_M(D_i\_wd) \times (1 - J_M(D_i\_ad)) - J_M(D_i\_ad) \times (1 - J_M(D_i\_wd))}$$

It is worth noting here, that two different concepts are used in the industry to refer to the radial response function of various measurements, namely that of J-functions and "Geometrical Factors". Whereas J-functions response variation from 0-100 percent will generally depend on the end-values of "$M_{xo}$" and "$M_t$" themselves there exists a class of measurements (e.g. induction-type electromagnetic resistivity measurements) whereby the J-functions are independent of the values of "$M_{xo}$" and "$M_t$". It is in these cases that one speaks of a geometrical factor, instead of J-functions.

In any case, the idea when working in general with J-functions dependent upon the end-values of "$M_{xo}$" and "$M_t$", is to re-inject the values of "$M_{xo}$" and "$M_t$"—inverted above— into the J-function itself, and solve again for new "$M_{xo}$" and "$M_t$" values, until a self-consistent iteration or answer is produced. In the case where different measurements may be "entangled" together, whereby the J-function of some measurement, may not just depend upon the end-values of "$M_{xo}$" and "$M_t$" of the same measurement, but also upon the end-values of other measurements (e.g. neutron porosity "Tnph" and thermal neutron capture x-section "$\Sigma$" J-functions, not only depend on each other, but also depend on formation bulk-density "Rhob" to some extend as well), no particular complication is introduced, as one can proceed with individual "$M_{xo}$" and "$M_t$" inversions as before, for each individual "M" measurement, and then re-compute J-functions talking into account the "entangled" inverted end-points, and solve again for new "$M_{xo}$" and "$M_t$" values, until a self-consistent iterated answer is produced.

D. Petrophysical Formation Evaluation (FE)

Volumetrics

Figure 5:
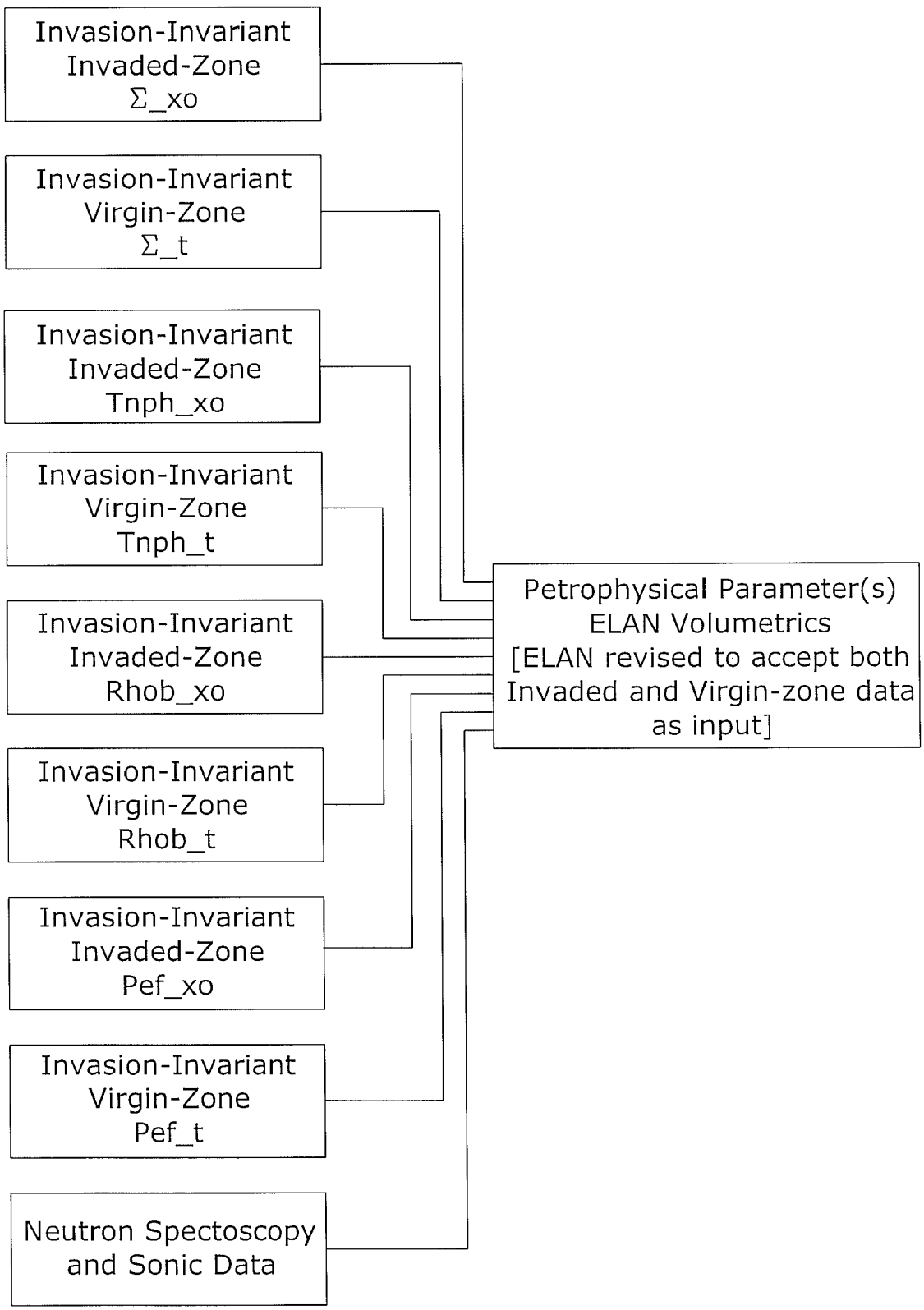
FIG. 5 is a diagram illustrating the subsurface earth formation petrophysical volumetric characteristics computed during the petrophysical computational phase of the present invention.

FIG. 5 describes a method of utilizing "probabilistic formation evaluation (FE) software" (e.g. ELAN sold by Schlumberger), tailored to receive as input the entire suite of newly manufactured invasion-invariant log datasets (i.e. the inverted virgin-zone and invaded-zone log equivalents) simultaneously, and the corresponding computed uncertainty errors (i.e. covariance matrix), and tailored to produce as output the petrophysical volumetric characteristics of the subsurface earth formations, and the corresponding propagated uncertainty errors (i.e. covariance matrix).

E. Petrophysical Formation Evaluation (FE)

Permeability From New Quantitative Spurt-Invasion Techniques

Figure 6:
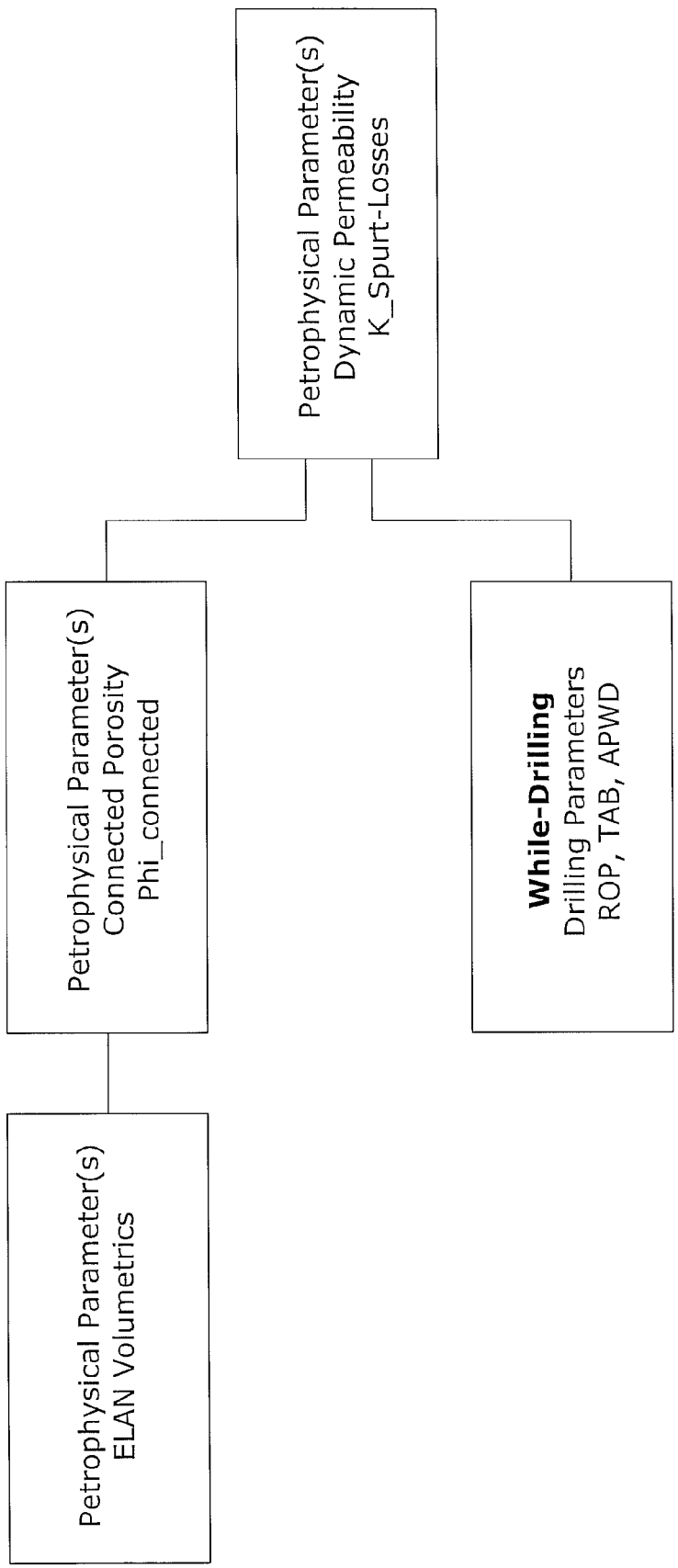
FIG. 6 is a diagram illustrating the permeability from new quantitative spurt-invasion losses computation techniques produced during the petrophysical computational phase of the present invention.

FIG. 6 illustrates the method of estimating a new dynamic permeability from new quantitative spurt-invasion losses estimation techniques. The expression "spurt-invasion losses" refers to that volume or quantity of mud-filtrate that suddenly invades the subsurface earth formation as it is freshly drilled.

The derivation of this new dynamic permeability estimate was made possible, first by quantifying this initial "spurt-invasion losses" just behind the drill-bit and just after the formation has been freshly drilled, and second by tying this initial "spurt-invasion losses" to formation permeability ($K_{fmt}$), mud-cake properties, and drilling parameters.

Figure 7:
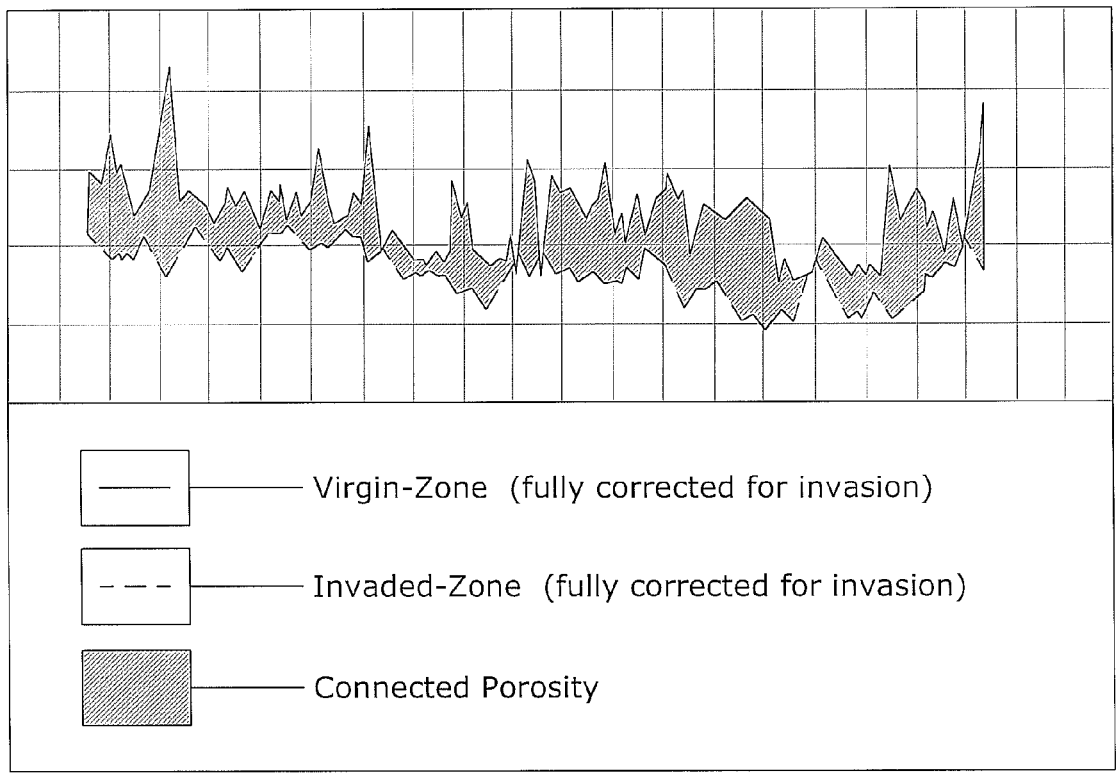
FIG. 7 is a graph illustrating the subsurface earth formation connected porosity determined from the inverted virgin-zone (i.e. zero-time state) and invaded-zone (i.e. infinite-time state) invasion-invariant equivalent log measurements.
Figure 8A:
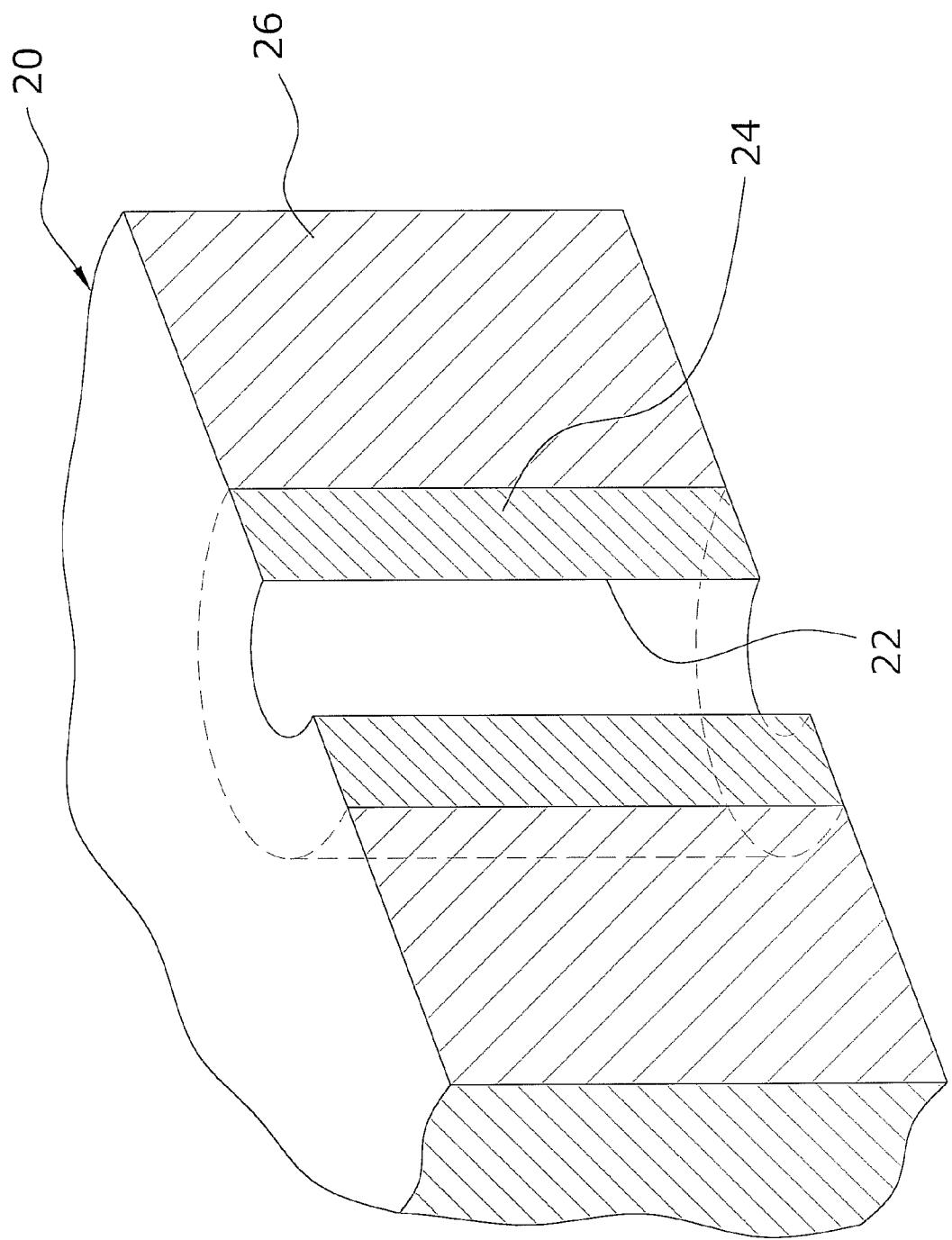
FIG. 8a is a diagram illustrating the invasion progression in relation to the wellbore and subsurface earth formation at the time of the first measurement (i.e. while-drilling measurement).
Figure 8B:
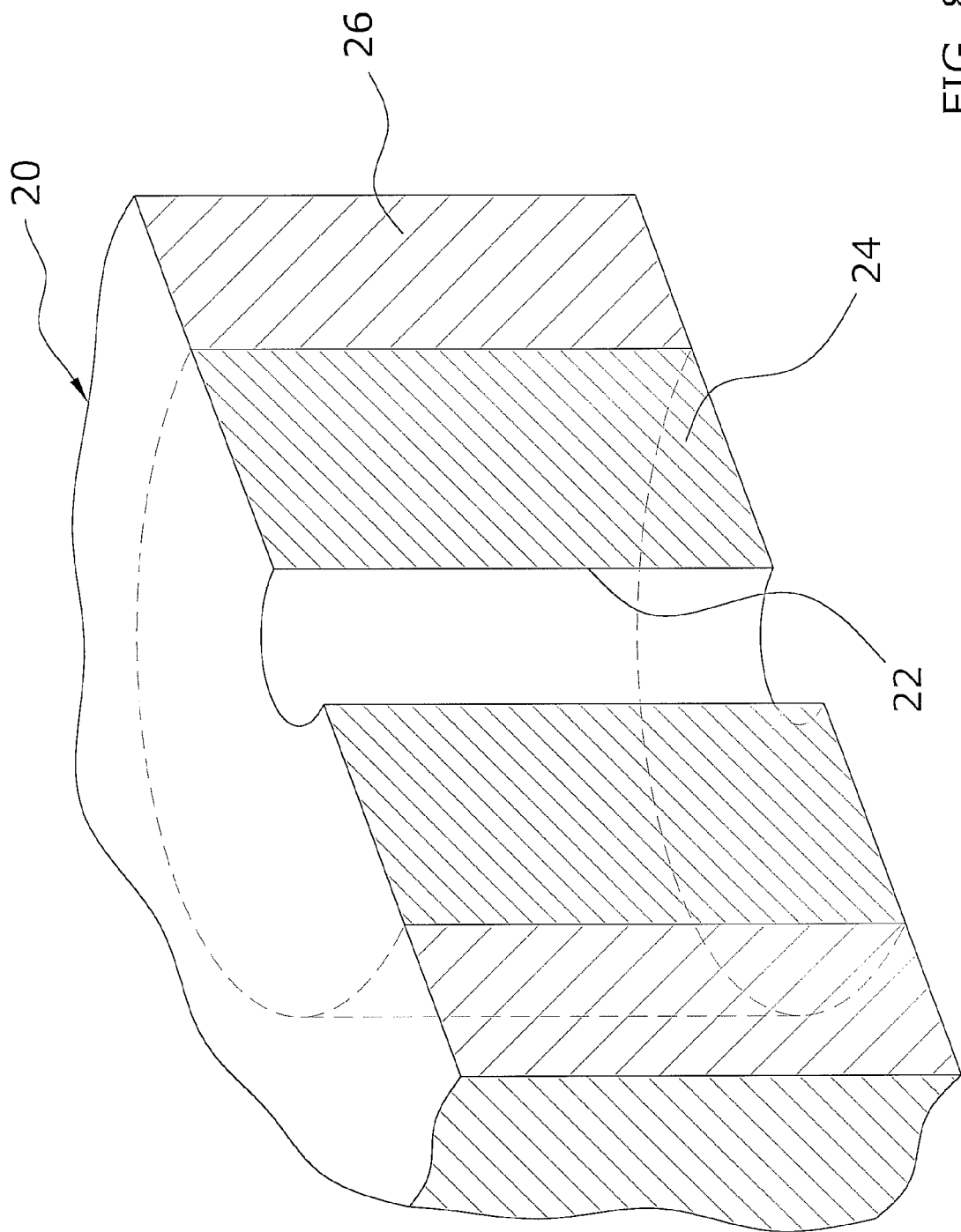
FIG. 8b is a diagram illustrating the invasion progression in relation to the wellbore and subsurface earth formation at the time of the second measurement (i.e. after-drilling measurement), wherein the invasion is progressed radially deeper in the second measurement than the first measurement.

Indeed, on the one hand, the availability of the depth-of-invasion while-drilling ($D_{i\_wd}$) and connected porosity ($\Phi_c$) (e.g. the area between the thermal neutron capture cross-section SIGMA measurement from the virgin-zone 26 $\Sigma_t$ and from the invaded-zone 24 $\Sigma_{xo}$) and illustrated in FIGS. 6 and 7, allows one to compute and quantify invasion losses as illustrated in the following equation:

$$\pi\left[\left(D_{i\_wd}+\frac{BS}{2}\right)^2-\left(\frac{BS}{2}\right)^2\right]\times\Phi_c$$

$$\pi\left[\left(D_{i\_wd}+\frac{BS}{2}\right)^2-\left(\frac{BS}{2}\right)^2\right]\times\frac{\sum_{xo}-\sum_t}{\sum_{mf}-\sum_{df}}$$

where $\Sigma_{mf}$ and $\Sigma_{df}$ stand respectively for the thermal neutron capture cross-section SIGMA, of the mud-filtrate and of the displaced or moveable fluids (usually the hydrocarbons, assuming the reservoir is at irreducible water saturation).

And on the other hand, an electrical model that divides invasion progress in two phases may also be utilized by the present invention, wherein the phases include a first phase, whereby spurt-invasion losses invade the formation 20 while it is being freshly drilled and penetrated by the drill-bit, resulting in invasion volume proportional to formation permeability ($K_{fmt}$), the time the formation 20 is exposed to the drill-bit (inversely proportional to rate-of-penetration ROP), and differential pressure ($P_{wd}-P_{fmt}$) in-between the pressure of the mud in the wellbore ($P_{wd}$) and the pressure of the formation fluids in the formation ($P_{fmt}$). And a second phase whereby invasion progresses and mud-cake deposits on the wellbore 22 wall (with the mud-cake thickness increasing proportionately to the volume of mud-filtrate that is invading the formation), from the time the drill-bit has drilled the formation 20 until the time the invasion-profiling sensors pass the same depth (time-after-bit TAB). These two phases allow us to express mud-filtrate invasion losses as shown in the following equation:

$$a\frac{<P_{wd}-P_{fmt}>}{ROP}K_{fmt}+b\frac{-1+\sqrt{1+c<P_{wd}-P_{fmt}>TAB\times K_{fmt}^2}}{K_{fmt}}$$

The following parameters are thus able to be tied together: Permeability ($K_{fmt}$) and drilling parameters (ROP, $P_{wd}$, TAB) on the one hand, to connected porosity ($\Phi_c$) and depth-of-invasion while-drilling ($D_{i\_wd}$) on the other hand. It is appreciated that in the case other equipment in the Bottom-Hole-Assembly (BHA) (such as near-bit stabilizers, etc.) interfere with mud-cake deposition and contribute to mud-cake removal while passing the same formation depth, then the expression for ROP can be substituted with a correspondingly more advanced formula, involving the integration of $ROP^{-1}$ over that depth interval or succession of depth intervals, whereby a BHA element with mud-cake removal action faces the formation (in this integration, ROP is to be substituted with drill-bit speed when Reaming and not in Drilling Mode). The emphasis on early data for permeability derivation purposes, is precisely because one does not wish to deal with such inaccurate integration techniques that introduce further uncertainty errors and complications.

It is also appreciated that in this relationship, the "a", "b", and "c" parameters present are "fudge" parameters, that depend on drill-bit characteristics (drill-bit type and design to define an "effective length"), and mud and mud-cake properties (mud solids percentage and mud-cake permeability). It is interesting to note, that the relationship shows a dependence of diameter of invasion with time like $\sqrt{\sqrt{t}}$, and comforts us in the idea that early-time spurt-invasion losses predominate and account for most of the invasion at the time of measurement.

The previous equations, provide us with the means to assess formation permeability thru a dynamic process (the process of invasion), and remedy to some extent existing static and empirical permeability estimation techniques. Following are solutions to the new permeability estimate, using the previous equations:

$$\pi\left[\left(D_{i\_}wd + \frac{BS}{2}\right)^2 - \left(\frac{BS}{2}\right)^2\right] \times \Phi_c =$$

$$a\frac{<P_{wd} - P_{fmt}>}{ROP}K_{fmt} + b\frac{-1 + \sqrt{1 + c < P_{wd} - P_{fmt} > TAB \times K_{fmt}^2}}{K_{fmt}}$$

$$\pi\left[\left(D_{i\_}wd + \frac{BS}{2}\right)^2 - \left(\frac{BS}{2}\right)^2\right] \times \Phi_c =$$

$$a\frac{<P_{wd} - P_{fmt}>}{ROP}K_{fmt} + \text{"neglected term to start the iterative process"}$$

$$K_{fmt}(0) = \pi\left[\left(D_{i\_}wd + \frac{BS}{2}\right)^2 - \left(\frac{BS}{2}\right)^2\right] \times \Phi_c \times \frac{ROP}{a < P_{wd} - P_{fmt} >}$$

$$K_{fmt}(1) =$$

$$\left[\frac{\pi\left[\left(D_{i\_}wd + \frac{BS}{2}\right)^2 - \left(\frac{BS}{2}\right)^2\right] \times \Phi_c - }{b\frac{-1 + \sqrt{1 + c < P_{wd} - P_{fmt} > TAB \times K_{fmt}(0)^2}}{K_{fmt}(0)}}\right] \times \frac{ROP}{a < P_{wd} - P_{fmt} >}$$

$$K_{fmt}(2) =$$

$$\left[\frac{\pi\left[\left(D_{i\_}wd + \frac{BS}{2}\right)^2 - \left(\frac{BS}{2}\right)^2\right] \times \Phi_c - }{b\frac{-1 + \sqrt{1 + c < P_{wd} - P_{fmt} > TAB \times K_{fmt}(1)^2}}{K_{fmt}(1)}}\right] \times \frac{ROP}{a < P_{wd} - P_{fmt} >}$$

$K_{fmt}(\infty) = $ "true permeability"

The earth formation connected porosity ($\Phi_c$) referenced above (using $\Sigma$ measurements, and/or Tnph and/or RhoB and/or NMR measurements in gas-bearing formations, and/or Carbon/Oxygen measurements in oil-bearing formations, and/or any invasion-dependent measurement in general), assumes irreducible formation water saturation and that the invading mud-filtrate only displaces the hydrocarbon phase. In the few challenging cases where formation water is movable (e.g. in case of injection water sweeping the formation), or formation water salinity varies from zone-to-zone, then a combination of the petrophysical volumetric characteristics of the formation, as produced during previously described step "D. Petrophysical Formation Evaluation (FE)—Volumetrics" above, can be used to express connected porosity ($\Phi_c$). These few challenging cases, might also require the application of the log-inject-log (LIL) techniques described earlier in the document, such as to produce a contrast between $\Sigma_{xo\_before-injection}$ and $\Sigma_{xo\_after-injection}$ (both derived using equations of the present invention), that is a direct proxy for connected porosity $\Phi_c$).

F. Petrophysical Formation Evaluation (FE)

Archie's Resistivity Equation Parameters "m" and "n"

Figure 9:
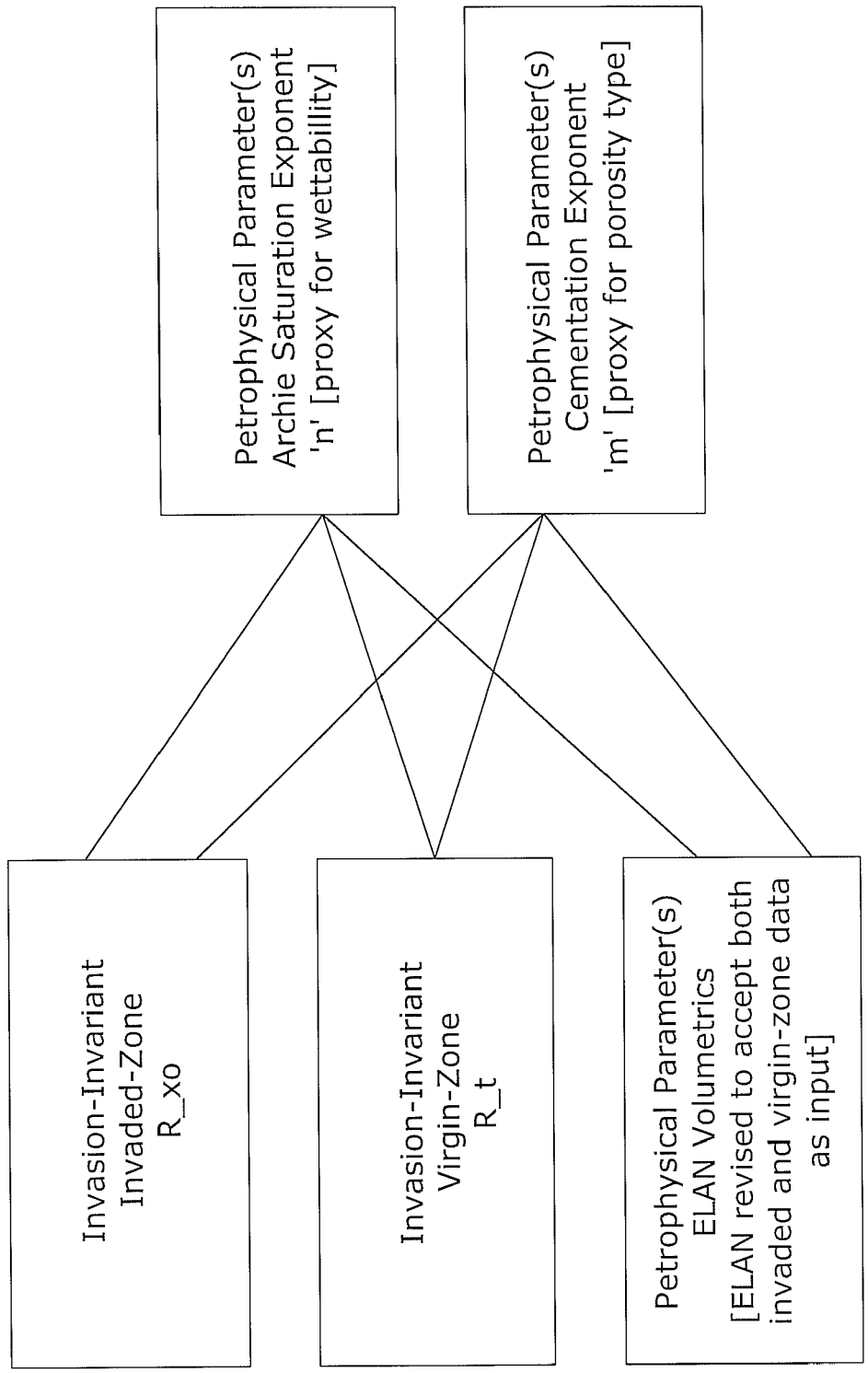
FIG. 9 is a diagram illustrating the computation of Archie's resistivity equation parameters during the petrophysical computational phase of the present invention.
Figure 10:
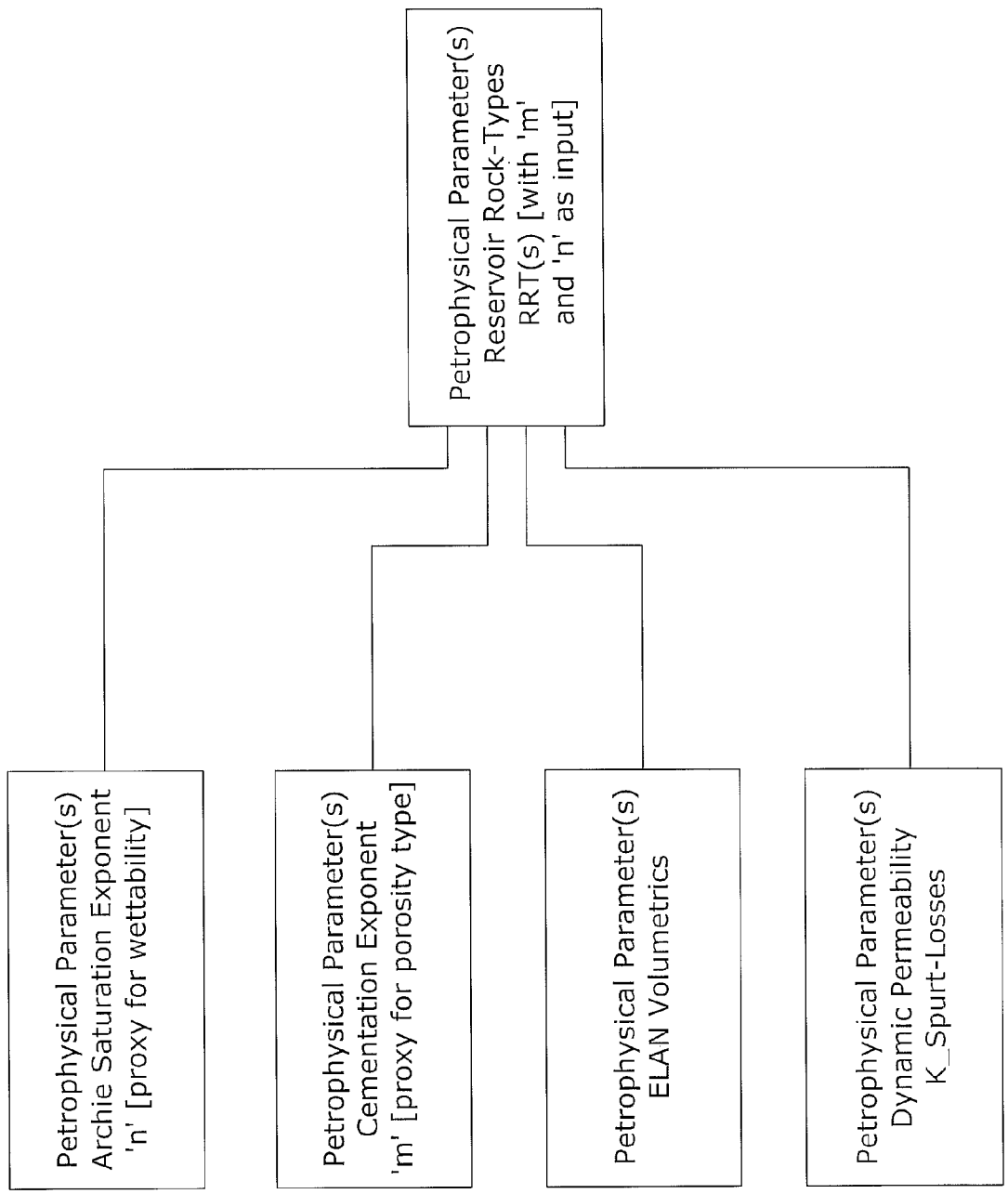
FIG. 10 is a diagram illustrating the computation of the reservoir (i.e. subsurface earth formation) rock-types (RRT's) during the petrophysical computational phase of the present invention.

The present invention preferably utilizes Archie's resistivity equations for the invaded-zone 24 and virgin-zone 26 as illustrated in FIG. 9. The Archie's resistivity equation parameters cementation factor "m" and saturation exponent "n" are computed as follows, in case water-base-mud (WBM) filtrate salinity is close to formation water salinity, otherwise a modified parametric resistivity equation is required (and in the scenario where formation water salinity varies as well, then the application of the log-inject-log LIL techniques described earlier in the description of the present invention, may be required as well):

$$R_{xo} = \frac{R_w}{\Phi^n S_{xo}^n} = \frac{R_w}{\Phi^{m-n} V_{xo}^n}$$

$$R_t = \frac{R_w}{\Phi^m S_w^n} = \frac{R_w}{\Phi^{m-n} V_w^n}$$

$$n = \frac{\ln\left(\frac{R_t}{R_{xo}}\right)}{\ln\left(\frac{V_{xo}}{V_w}\right)}$$

$$m = n + \frac{\ln\left(\frac{R_w}{R_{xo} V_{xo}^n}\right)}{\ln(\Phi)}$$

The Archie resistivity equations have been extensively used in the past, either to estimate both the cementation factor "m" and the saturation exponent "n" from surface measurements done on formation core plugs, carried-out in dedicate labs, or to estimate just the cementation factor "m" in-situ (i.e. from downhole log measurements) assuming water saturation in the invaded-zone 24 is close to 1 (i.e. assuming that hydrocarbons have been completely flushed by water-base-mud WBM filtrate and $S_{xo}"\approx1$ in the equations above); however, this is the first time we have the means to compute both Archie's resistivity equation parameters cementation factor "m" and "n" simultaneously and continuously in-situ, at every depth. The derived "m" and "n" values depth-by-depth, contain key and fundamental information about the rock fabric, texture, and wettability of the earth formations.

G. Petrophysical Formation Evaluation (FE)

Reservoir Rock-Typing

Prior to present invention becoming available, neural-network based reservoir rock-typing (RRT) techniques (whereby the neural-network NN was trained utilizing downhole log measurements vs. subsurface earth formation core data from selected same wellbores), are being used to infer empirical Archie's resistivity equation parameters cementation factor "m" and saturation exponent "n", which are in-turn used to estimate formation water and hydrocarbon saturations from resistivity measurements. In carbonate formations in particular, such empirical techniques do not work very well, given one tries to estimate parameters such as "m" and "n", that are known to depend on formation rock fabric, texture, and wettability, from essentially "volumetric" downhole log measurements instead (i.e. log measurements that just depend on the overall fractional and mineralogical composition of the rock).

Because the present invention enables a direct computation of Archies' resistivity equation parameters cementation factor "m" and saturation exponent "n" instead, neural-network based reservoir rock-typing (RRT) techniques are set to benefit from this additional data available as input (whereas it was the other way around, and "m" and "n" were empirical outputs that followed from the neural-network based reservoir rock-typing RRT techniques). We are now in a much better position—at least in principle—to better resolve fine reservoir rock-types (RRT's) subtle differences, structure and sequences.

One should note however, that whereas reservoir rock-types (RRT's) are defined from subsurface earth formations core data, logging-while-drilling data acquisition vs. coring activities is mutually exclusive, which requires a work-around traditional neural-network training techniques (LWD logs and core data cannot be acquired together on the same well as they are technically incompatible). More specifically, the neural-network training will have to take place using "ground-truth" data rather than log data. The expression "ground-truth" data in this context refers to formation or core actual petrophysical and reservoir characteristics (e.g. lithology, porosity, connected porosity, water and hydrocarbon saturation(s), cementation factor and saturation exponent, permeability, etc.).

H. Optimized Tool

Figure 11:
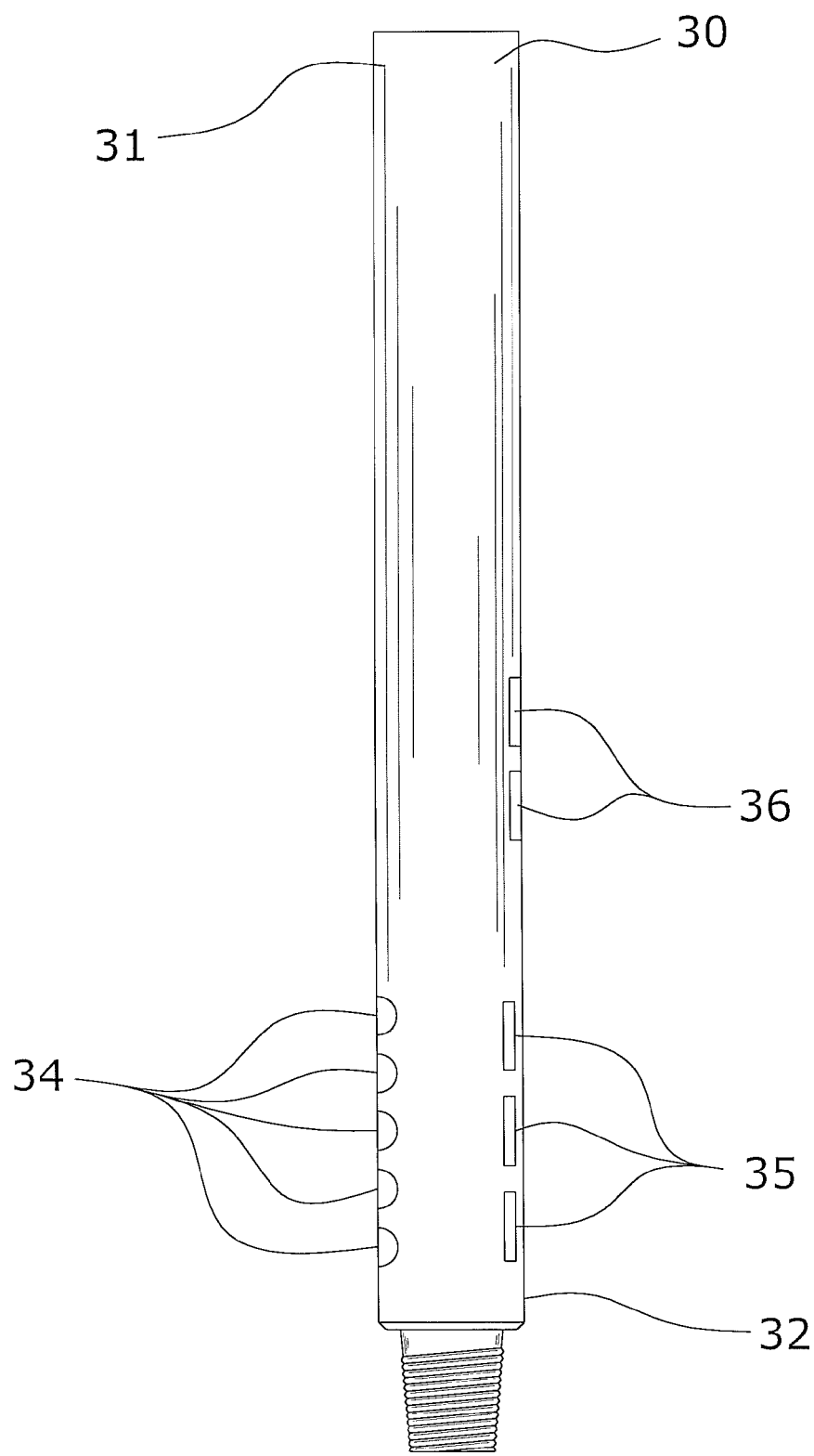
FIG. 11 is a side view illustrating an optimized tool utilized to record measurements.

The present invention also discloses an optimized logging-while-drilling tool 30 as illustrated in FIG. 11. The tool 30 is comprised of a drill collar fitted with sensors, and specifically utilizing neutron-type measurements 31, fully integrated with laterolog-type array-resistivity measurements 34 (such as GEOVISION sold by SCHLUMBERGER), and ideally co-located on diametrically opposite sides of the same collar, and as close to the drill-bit as possible. The first reason is to ensure that both type measurements are identically affected by invasion progression at the time the measurements are made, such that the techniques described earlier in the document work best, wherein we utilize laterolog-type array-resistivity measurements to profile invasion, which is subsequently used to compute other measurements invasion-invariant equivalents.

The second reason is that neutron-type measurements, especially thermal neutron capture cross-section SIGMA ($\Sigma$), neutron porosity (Tnph), Carbon/Oxygen ratios, and other types or combinations of "near" detector and "far" detector ratios (where "near" and "far" refers to the distance from the neutron source to the detector), constitute some of the richest petrophysical measurements that can be envisioned (and which are precisely invasion-dependent), and with the widest spectrum of petrophysical applications. Therefore the optimized logging-while-drilling tool 30 illustrated in FIG. 11, would enable us to manufacture with unprecedented reliability, two separate neutron-type measurements log datasets totally immune to invasion, and that respectively embody the invaded zone 24 alone and the virgin zone 26 alone.

It is appreciated that existing logging-while-drilling 2 MHz/400 kHz propagation resistivity-type of measurements, are not applicable here. On the one hand, these measurements depth-of-investigation and vertical resolution both depend on the resistivity reading itself, and on the other hand, these measurements are sensitive to a range of other effects (polarization horns, anisotropy, dielectric, etc.) which renders them not the measurements of choice for invasion profiling purposes.

Ideally one would like to have dedicated invasion-profiling array-resistivity measurements 34 co-located and integrated with every other individual logging-while-drilling measurement 36 requiring an invasion correction along the methodology of the present invention, however this might be impractical, especially where time-after-bit (TAB) is longer for measurements and sensors located higher-up in the logging-while-drilling toolstring, resulting in too-deep an invasion profile already at the time of the measurement. But if one were to select a single measurement to integrate and co-locate with the invasion-profiling laterolog-type array-resistivity measurements, as close to the drill-bit as possible, then it would have to be the suite of neutron-type measurements described above (equipped with single or multiple neutron sources and multiple detectors and detector types to cover the wealth of neutron-formation interaction types).

I. Operation of Preferred Embodiment

In use, the present invention takes two measurements of the subsurface earth formation at two different times (and exactly 2 only) as illustrated in FIG. 1, using logging-while-drilling measurements wherein the two measurements are affected differently by mud-filtrate invasion-front progression, and extracts quantitatively and scientifically, virgin-zone 26 equivalent measurements (also referenced in the description with the subscript mnemonic "t", which stands for "true") as if invasion had never taken place, and invaded-zone 24 equivalent measurements (also referenced in the description with the subscript mnemonic "xo") as if invasion had already progressed indefinitely. The present invention goes on to show that with the newly available virgin-zone 26 equivalent measurements "as if invasion had never taken place" (i.e. zero-time state), and invaded-zone 24 equivalent measurements "as if invasion had progressed already indefinitely" (i.e. infinite-time state), we can actually use the initial stage invasion process itself (i.e. the early-time invasion process itself), to estimate the earth formation 20 permeability. Such dynamic permeability estimate, takes a look at a single early-time snapshot of the invasion (and exactly 1 early-time snapshot only), and inverts earth formation 20 permeability by utilizing the equations and computations detailed in the description of the present invention.

The first resistivity measurements (laterolog-type array-resistivity measurements) from the while-drilling pass (i.e. made during the initial phase of drilling), are combined with the second resistivity measurements from the after-drilling pass (i.e. made substantially later after the initial phase of drilling). It is appreciated that the present invention takes several other first measurements from the while-drilling pass, and several other second measurements from the after-drilling pass. The resistivity measurements are blended together to solve an over-determined system of equations (described in the previous sections), which brings about a reliable single true resistivity ($R_t$) value (instead of two potentially different values if the first measurements from the while-drilling pass and the second measurements from the after-drilling pass had been inverted separately and not blended together), a reliable single invaded-zone resistivity ($R_{xo}$) value (instead of two potentially different values if the first measurements from the while-drilling pass and the second measurements from the after-drilling pass had been inverted separately and not blended together), a reliable depth-of-invasion while-drilling ($D_i\_wd$) value, and a reliable depth-of-invasion after-drilling ($D_i\_ad$) value.

The other measurements from the while-drilling and after-drilling passes, are then combined together utilizing the depths-of-invasion ($D_i\_wd$ and $D_i\_ad$) already computed utilizing the blended array-resistivity measurements, to produce two inverted invasion-invariant sets of measurements (i.e. sets of measurements immune to invasion, because one set of measurements relates to the earth formation 20 as if invasion had never taken place on the one hand, and another set of measurements relates to the subsurface earth formation 20 as if invasion had already progressed indefinitely on the other hand). Such produced inverted measurements (including but not limited to, thermal neutron capture cross-section SIGMA $\Sigma_{xo}$ and $\Sigma_t$ values for example), are then utilized to derive various petrophysical volumes and volumetric parameters of the earth formation 20, such as connected-porosity ($\Phi_c$) and various fluid saturations, wherein the derivation does not require resistivity measurements (i.e. does not require $R_t$ and $R_{xo}$).

The petrophysical volumes and volumetric parameters of the earth formation 20, are combined along with resistivity measurements ($R_t$ and $R_{xo}$), to compute Archie's resistivity equation parameters cementation factor "m" and saturation exponent "n" (which are sensitive to pore-network type and wettability). The depth-of-invasion while-drilling ($D_i\_wd$), the connected-porosity ($\Phi_c$), and various drilling parameters (rate-of-penetration ROP, time-after-bit TAB, and downhole mud annular pressure-while-drilling $P_{wd}$), are used to compute the permeability ($K_{fmt}$) of the earth formation 20. And then all of the above (i.e. petrophysical volumes and volumetric parameters, Archie's resistivity equation parameters cementation factor "m" and saturation exponent "n", and dynamic permeability estimate) are utilized for reliable reservoir rock-typing (RRT) purposes.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A logging while drilling method, comprising:
   drilling a wellbore within an earth formation;
   circulating a fluid within said wellbore and injecting it inside said earth formation under pressure;
   taking a first measurement of said earth formation using a well logging instrument having a selected type of formation sensor thereon, the selected type of sensor generating signals corresponding to a physical property of the earth formation, as altered by said fluid within said earth formation, during an initial stage of drilling said wellbore, said initial stage taking place while drilling the wellbore;
   taking a second measurement of said earth formation using a well logging instrument having the selected type of formation sensor thereon, as altered by said fluid within said earth formation, during a later stage after said initial stage of drilling said wellbore;
   determining a zero-time state measurement of said earth formation, from a combination of said first measurement and said second measurement, wherein said zero-time state measurement represents the physical property of said earth formation prior to drilling said wellbore; and
   determining an infinite-time state measurement of said earth formation, from a combination of said first measurement and said second measurement, wherein said infinite-time state measurement represents the physical property of said earth formation as altered by said fluid within said earth formation assuming said fluid injection has continued indefinitely, wherein said first measurement and said second measurement are simultaneously inverted in a system of equations wherein said first measurement comprises a resistivity measurement and said second measurement comprises a resistivity measurement, and wherein said first and second measurements are simultaneously inverted to produce a zero-time state resistivity, an infinite-time state resistivity, an initial-stage depth-of-invasion and a later-stage depth-of-invasion.

2. The method of claim 1, wherein said first measurement and said second measurement are combined with said initial-stage depth-of-invasion and said later-stage depth-of-invasion to produce said zero-time state measurement and said infinite-time state measurement.

3. The method of claim 2, wherein said zero-time state measurement and said infinite-time state measurement are simultaneously inverted to produce petrophysical volumes and volumetric parameters of said earth formation, including connected porosity, without requiring said zero-time state resistivity and without requiring said infinite-time state resistivity.

4. The method of claim 3, wherein said produced petrophysical volumes and said volumetric parameters, including said connected porosity, without requiring said zero-time state resistivity and without requiring said infinite-time state resistivity, together with said zero-time state resistivity and with said infinite-time state resistivity, are used to compute an improved static permeability estimate.

5. The method of claim 3, wherein said initial stage depth-of-invasion, and said petrophysical volumes and said volumetric parameters of said earth formation, including said connected porosity, and a plurality of drilling parameters are all combined together to compute a dynamic permeability estimate.

6. The method of claim 3, wherein said produced petrophysical volumes and said volumetric parameters, without requiring said zero-time state resistivity and without requiring said infinite-time state resistivity, are now combined with said zero-time state resistivity and said infinite-time resistivity to derive any at least one resistivity equation parameter.

7. The method of claim 3, wherein said petrophysical volumes and said volumetric parameters of said earth formation include a connected porosity, a static permeability estimate, a dynamic permeability estimate, and at least one resistivity equation parameter, wherein said connected porosity, said static permeability estimate, said dynamic permeability estimate, and said least one resistivity equation parameter are used simultaneously to characterize reservoir rock types.

* * * * *